United States Patent
Ito et al.

(10) Patent No.: US 6,461,134 B1
(45) Date of Patent: Oct. 8, 2002

(54) MOLD EXCHANGER SYSTEM FOR TIRE VULCANIZING MACHINE

(75) Inventors: Taizo Ito, Tokyo (JP); Akio Obayashi, Tokyo (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/701,461

(22) PCT Filed: Mar. 23, 2000

(86) PCT No.: PCT/JP00/01793
§ 371 (c)(1),
(2), (4) Date: Feb. 1, 2001

(87) PCT Pub. No.: WO00/59700
PCT Pub. Date: Oct. 12, 2000

(30) Foreign Application Priority Data

Apr. 1, 1999 (JP) ............................................ 11-094916
Apr. 5, 1999 (JP) ............................................ 11-097589
Jun. 1, 1999 (JP) ............................................ 11-153376

(51) Int. Cl.$^7$ .............................................. B29C 33/30
(52) U.S. Cl. ..................... 425/28.1; 425/34.1; 425/186; 425/195
(58) Field of Search ..................... 425/34.1, 35, 28.1, 425/186, 195, 454

(56) References Cited

U.S. PATENT DOCUMENTS

| 1,544,011 A | | 6/1925 | William et al. | |
|---|---|---|---|---|
| 4,472,127 A | * | 9/1984 | Cyriax et al. | 425/186 |
| 4,601,648 A | * | 7/1986 | Amano et al. | 425/47 |
| 4,946,358 A | * | 8/1990 | Okuda et al. | 425/186 |
| 5,445,508 A | * | 8/1995 | Kubo et al. | 425/186 |
| 5,505,600 A | * | 4/1996 | Ureshino et al. | 425/186 |
| 5,723,154 A | * | 3/1998 | Irie et al. | 425/186 |

FOREIGN PATENT DOCUMENTS

| JP | A-59-70535 | 4/1984 |
|---|---|---|
| JP | A-59-70536 | 4/1984 |
| JP | A-60-159010 | 8/1985 |
| JP | A-7-100833 | 4/1995 |
| JP | A-10-6345 | 1/1998 |

* cited by examiner

Primary Examiner—James P. Mackey
(74) Attorney, Agent, or Firm—Oliff & Berridge, PLC

(57) ABSTRACT

A mold exchanger system includes a transfer device for transferring a mold into, and from a vulcanizing machine. The transfer device has a height adjusting mechanism for adjusting the transferring height of the mold, and a positioning mechanism for positioning the mold relative to the vulcanizing machine. The mold exchanger system has a simplified structure and yet allows the mold to be precisely centered and positioned relative to the vulcanizing machine, and to be smoothly transferred into, and removed from the vulcanizing machine, and significantly reducing the transfer time and the removing time to thereby improve the mold exchanging efficiency.

30 Claims, 31 Drawing Sheets

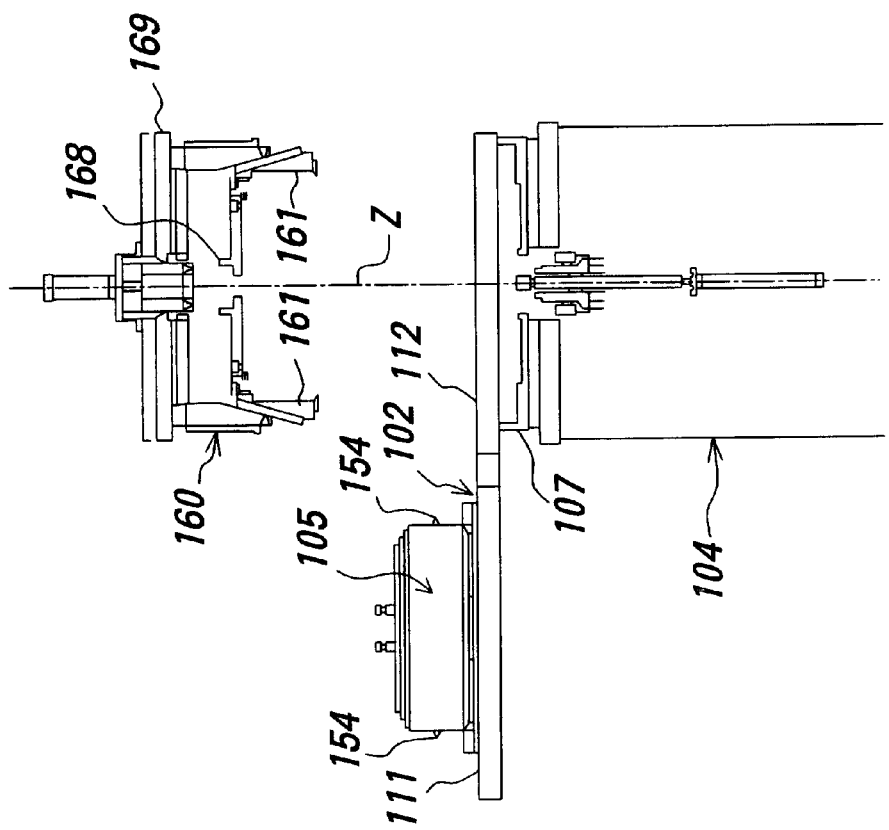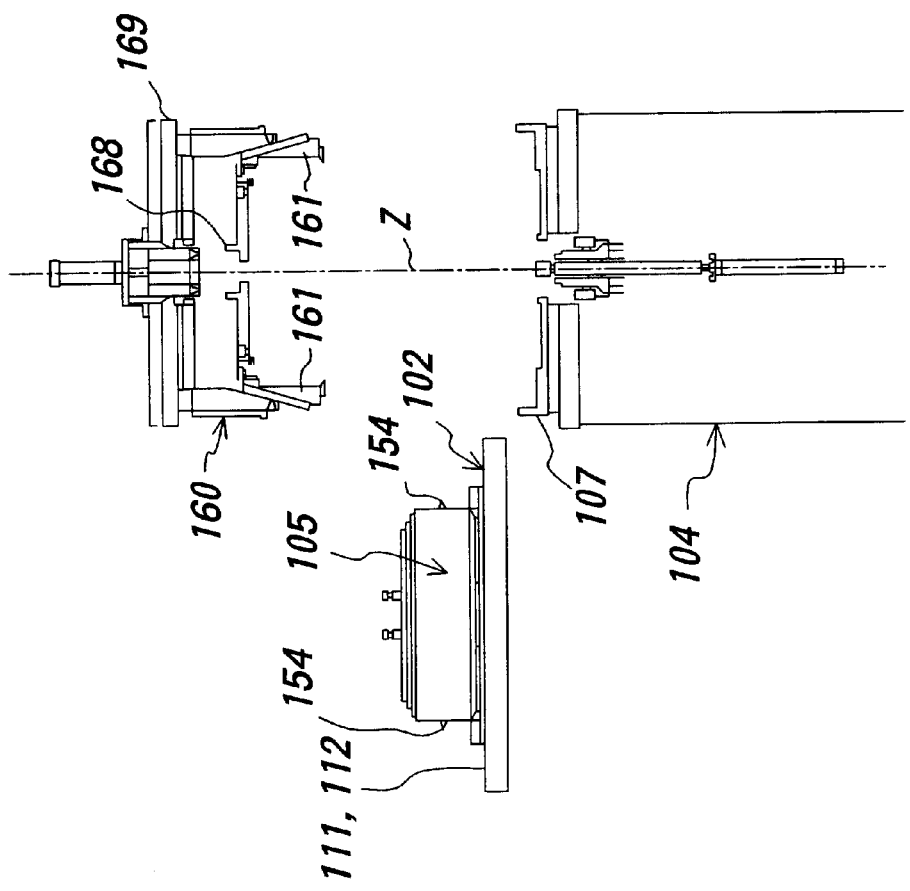

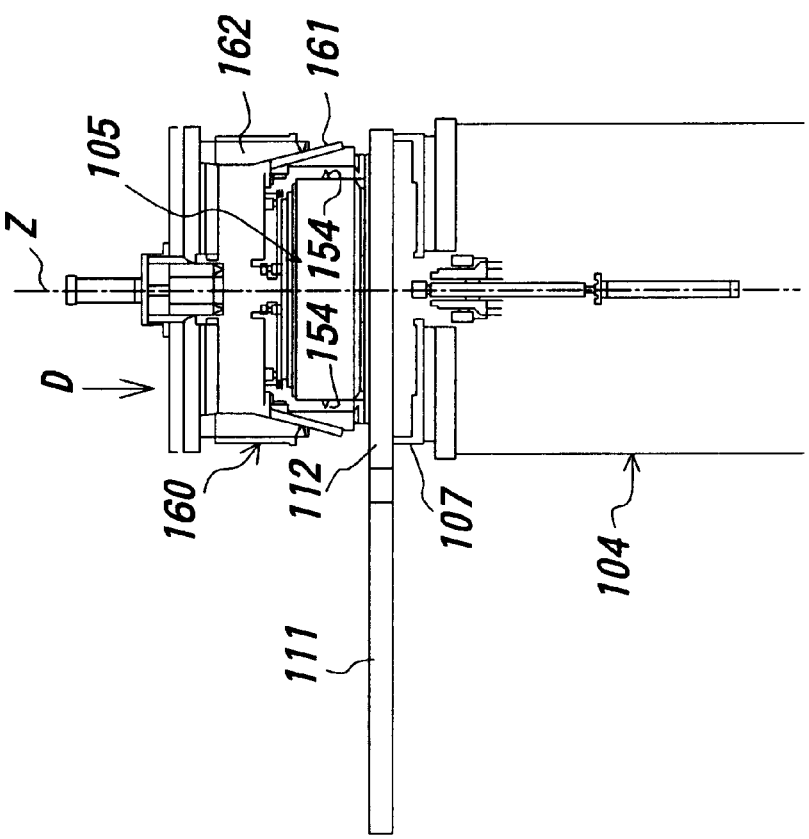
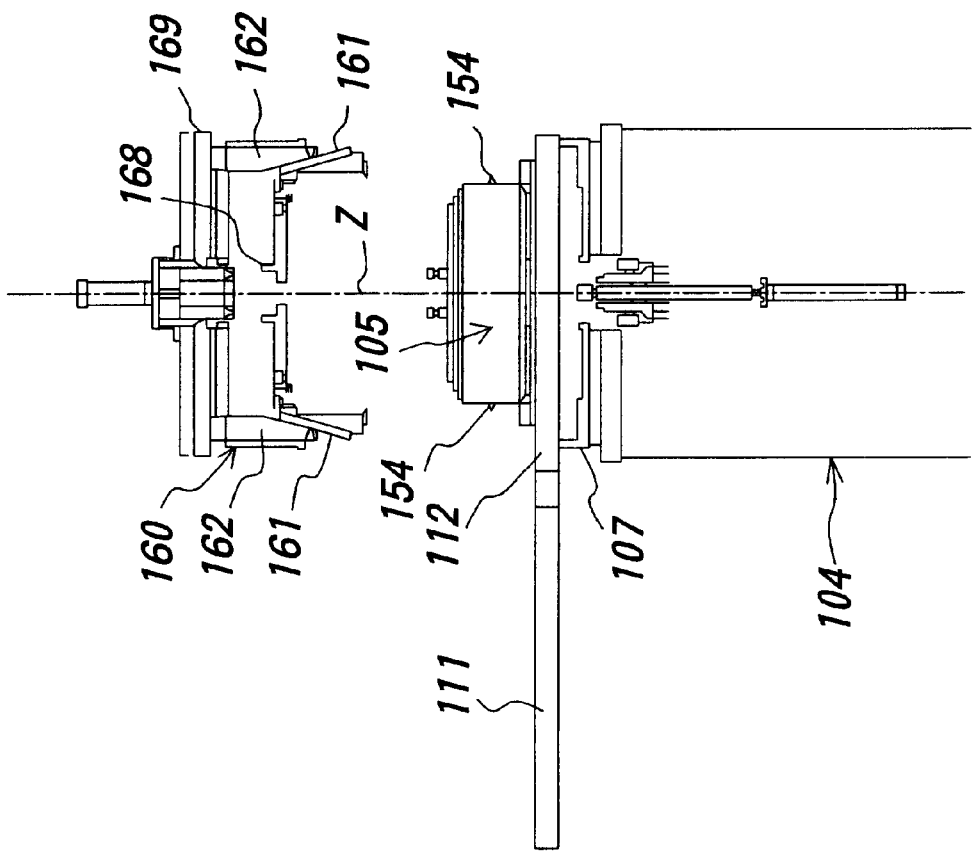

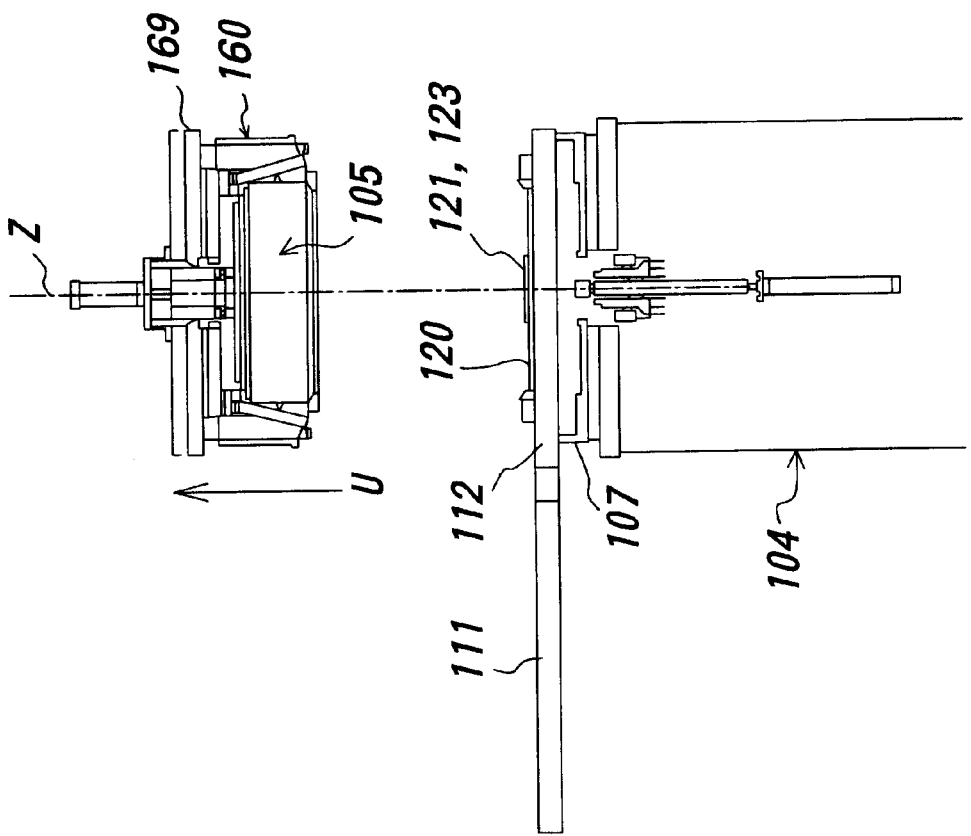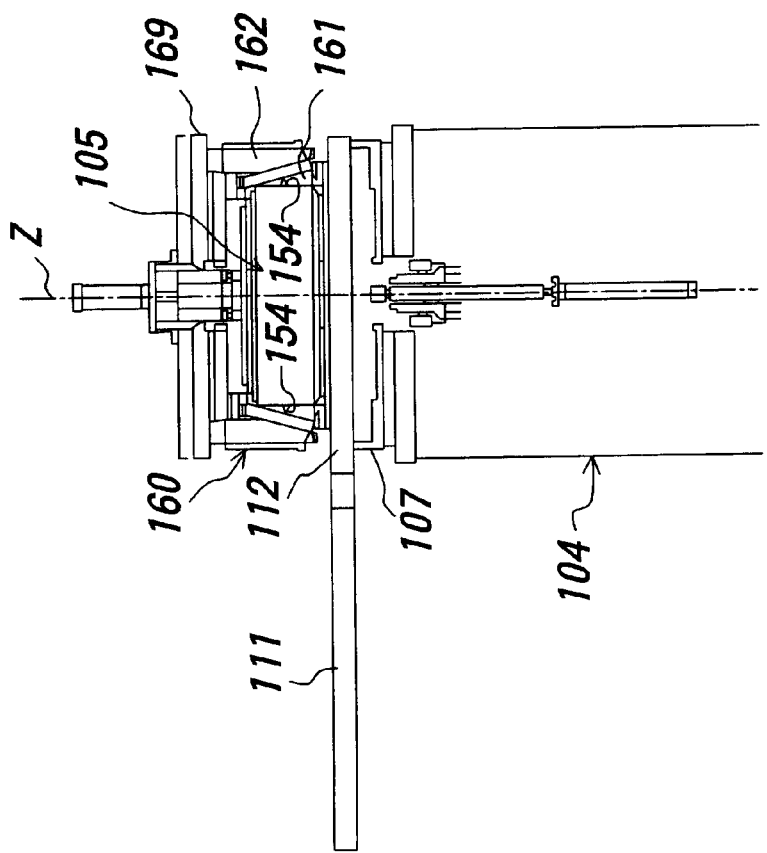

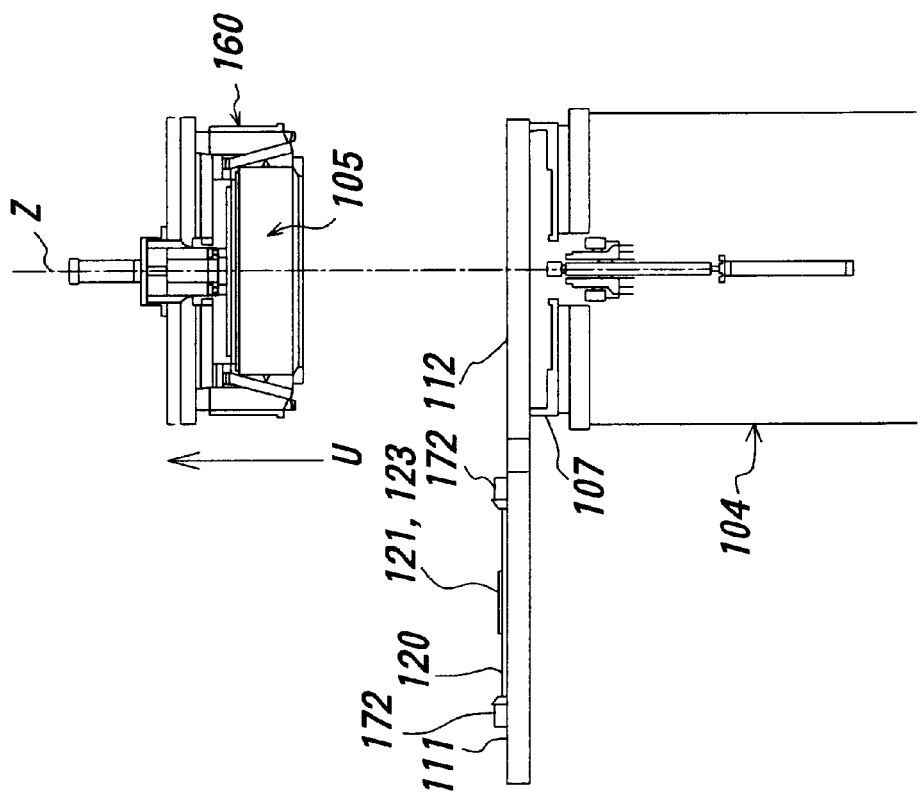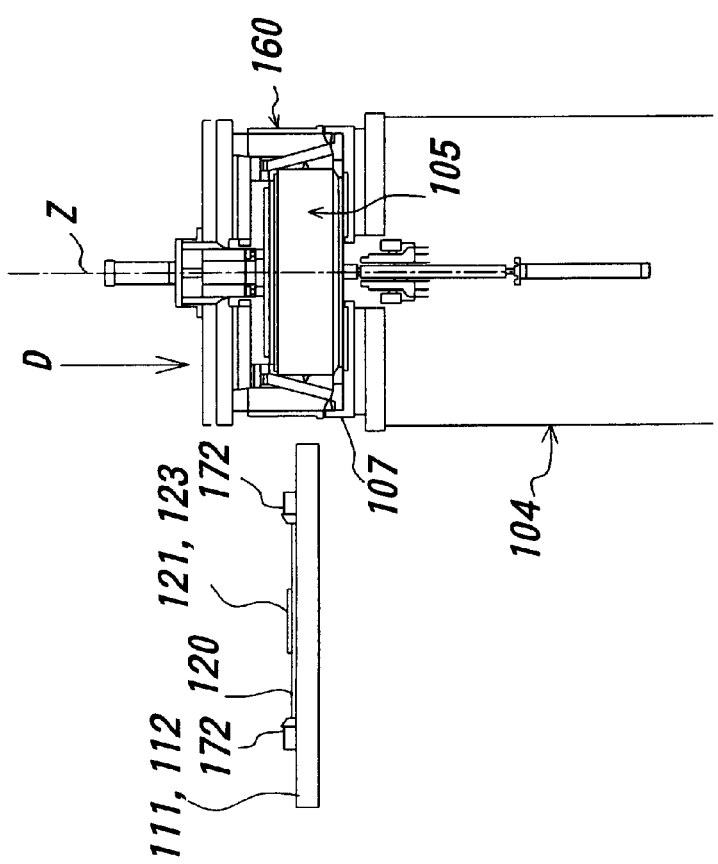

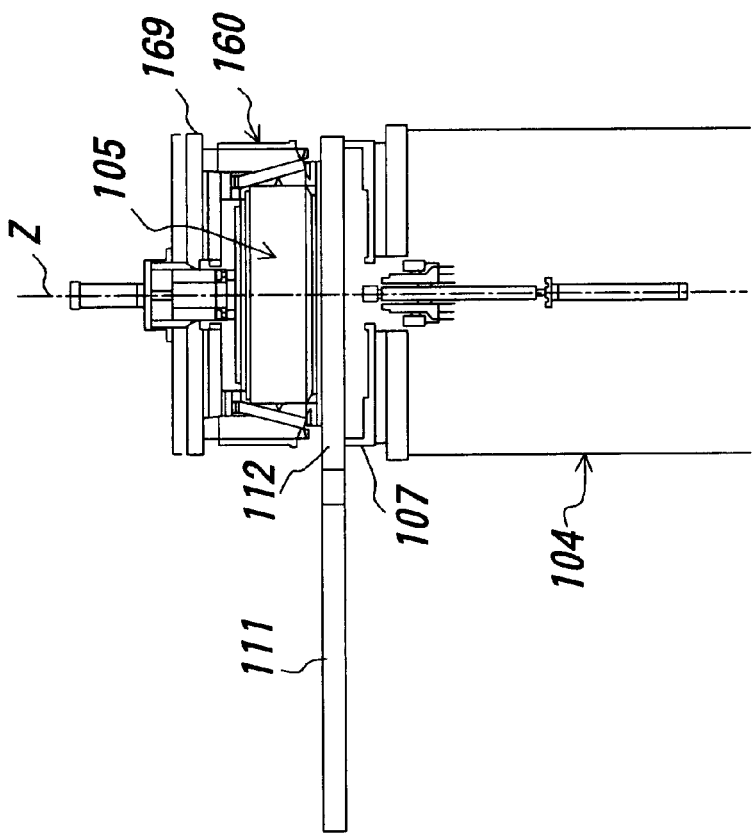
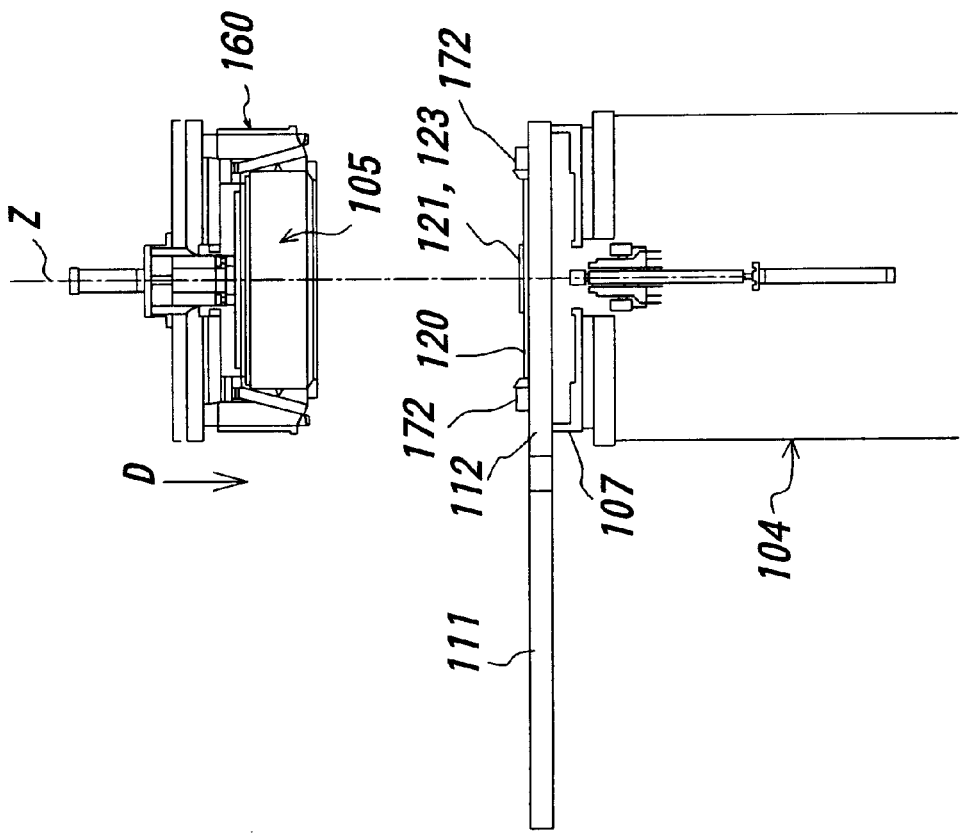

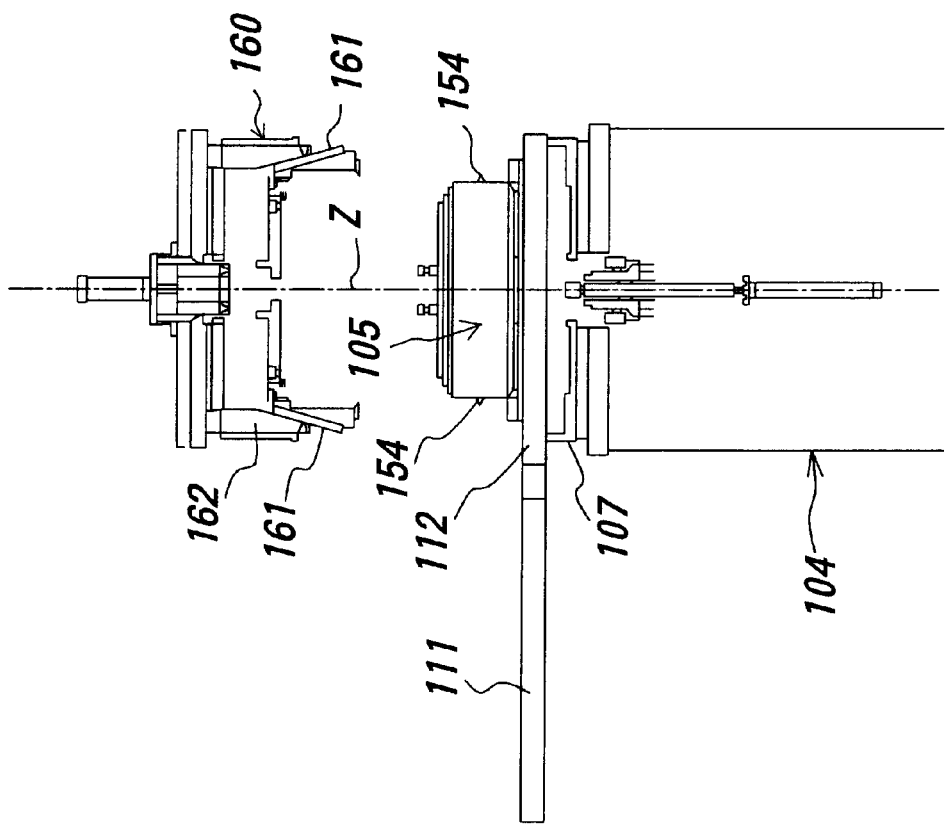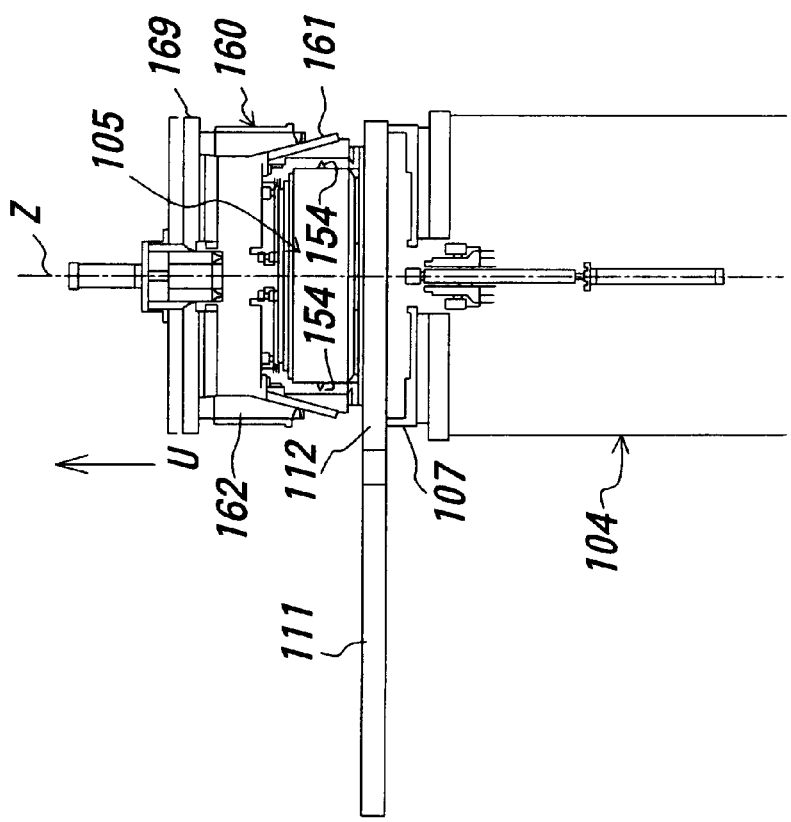

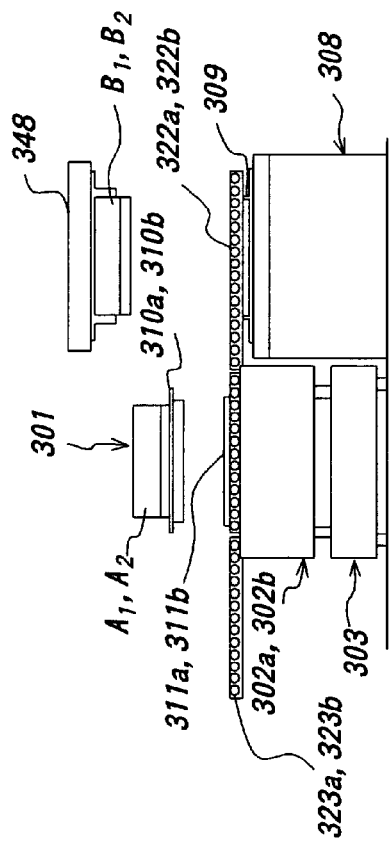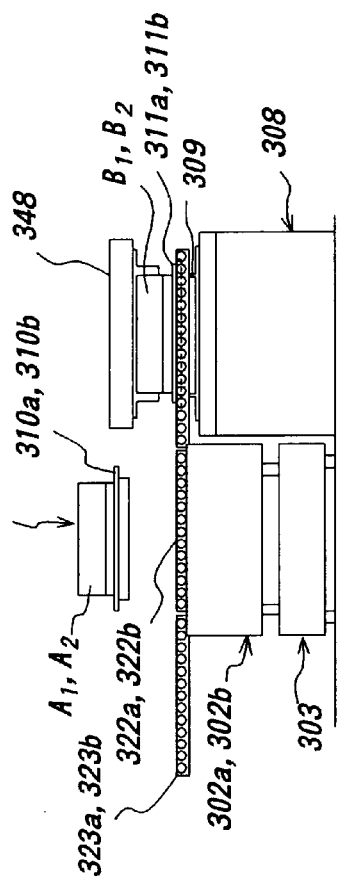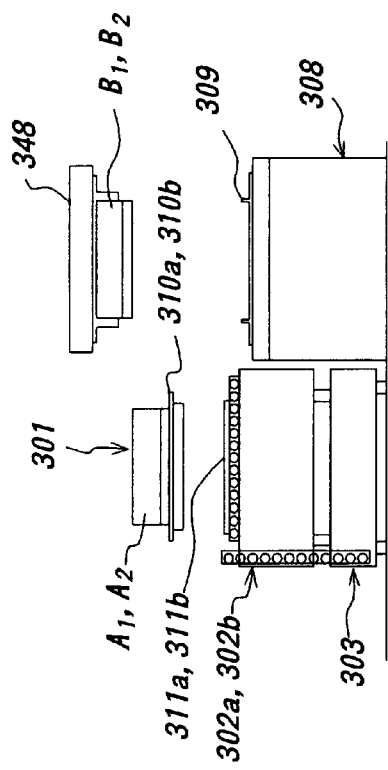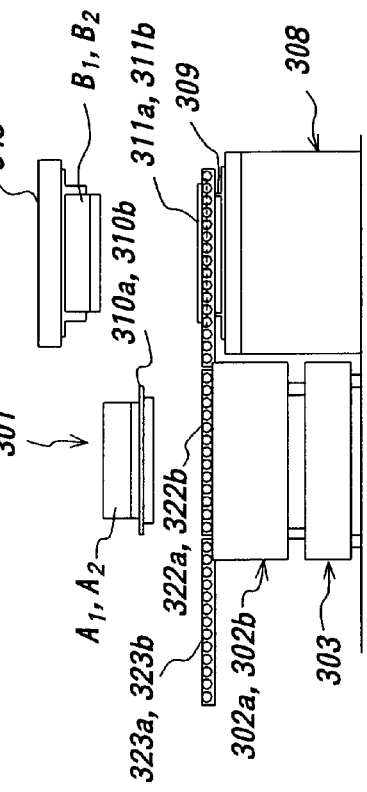

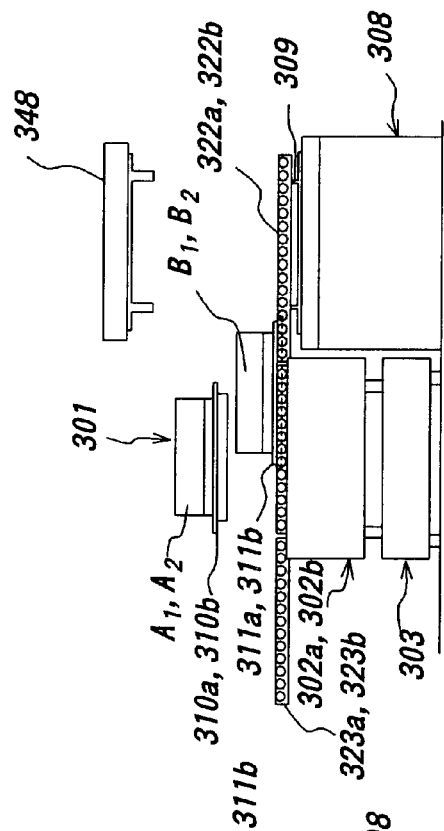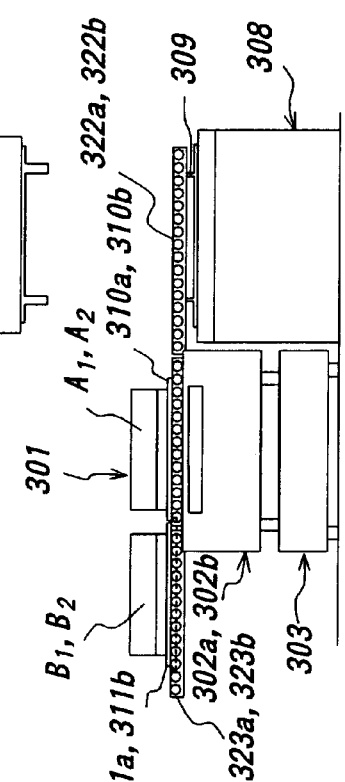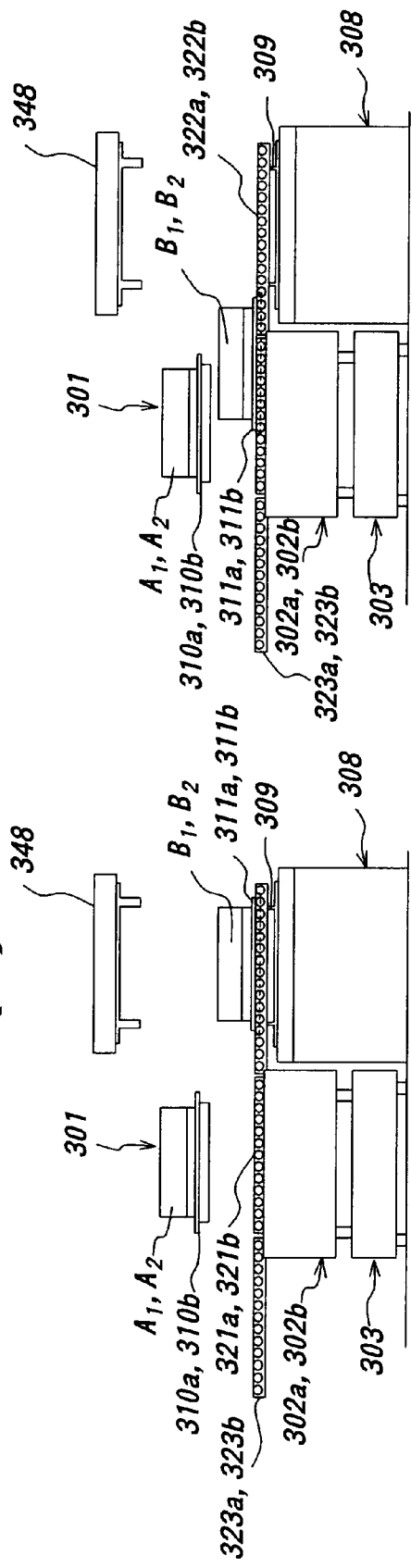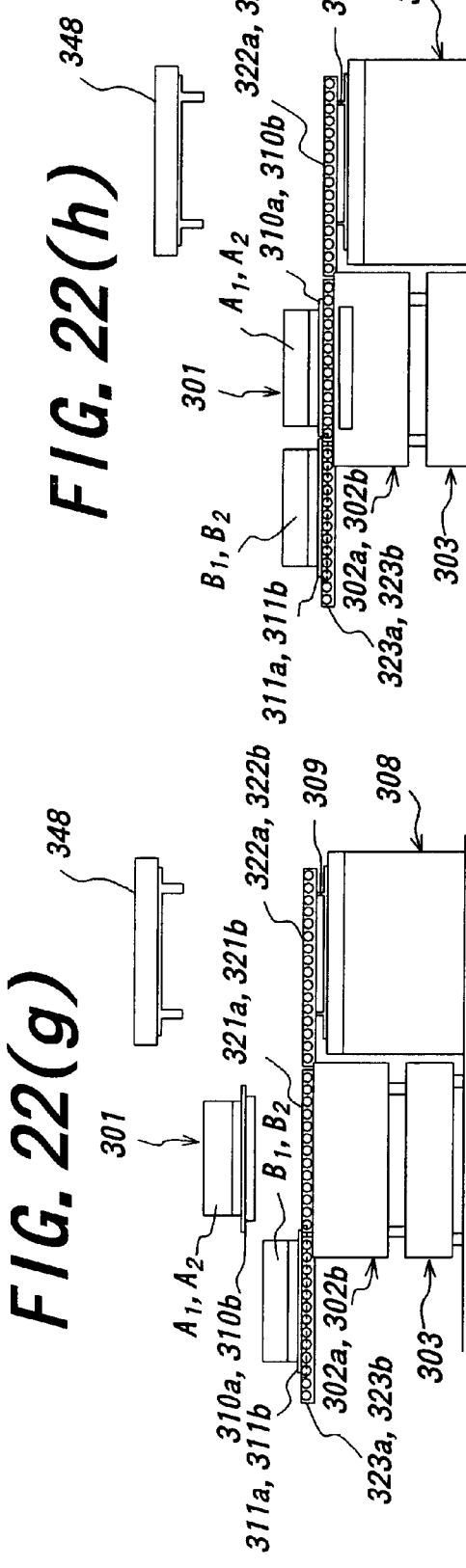

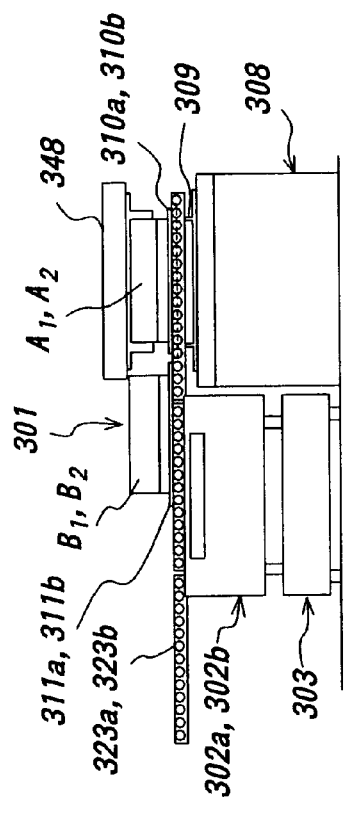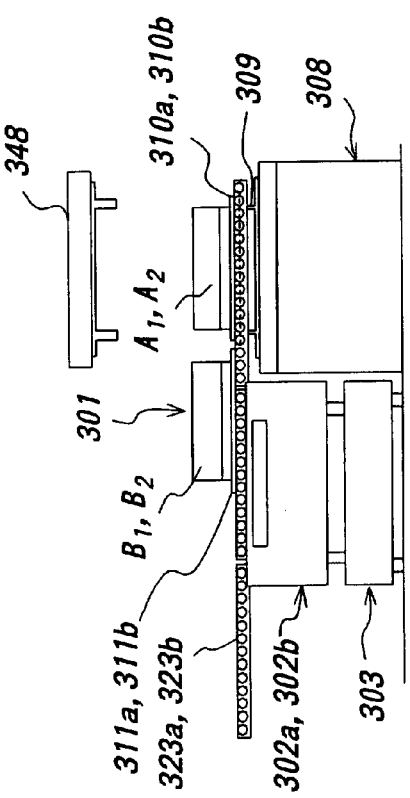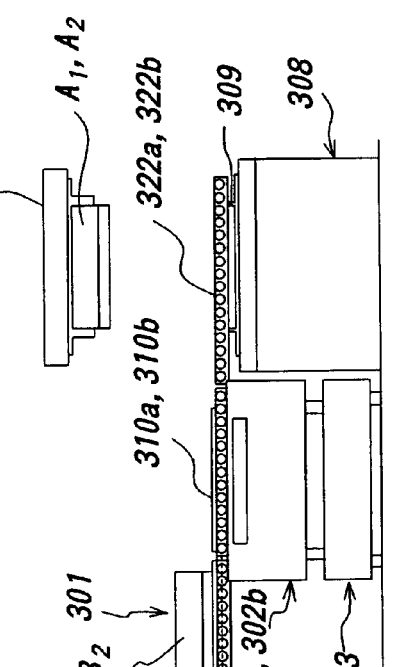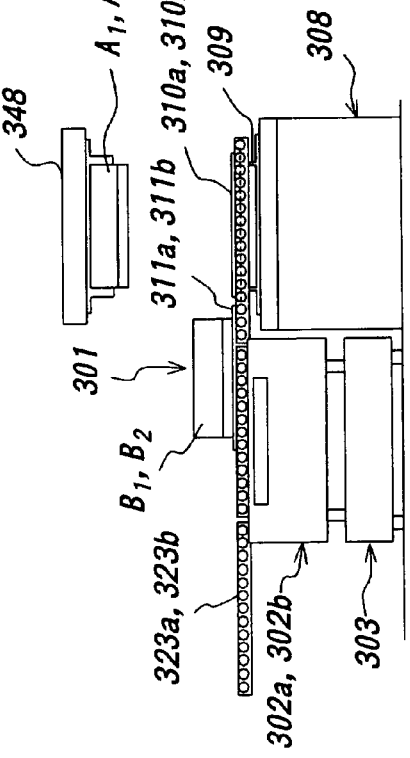

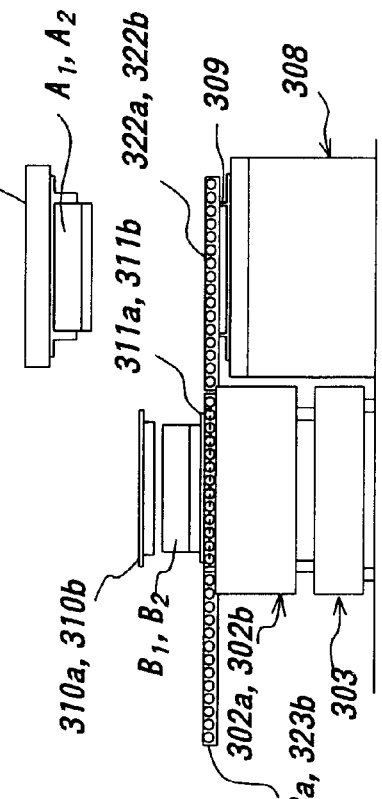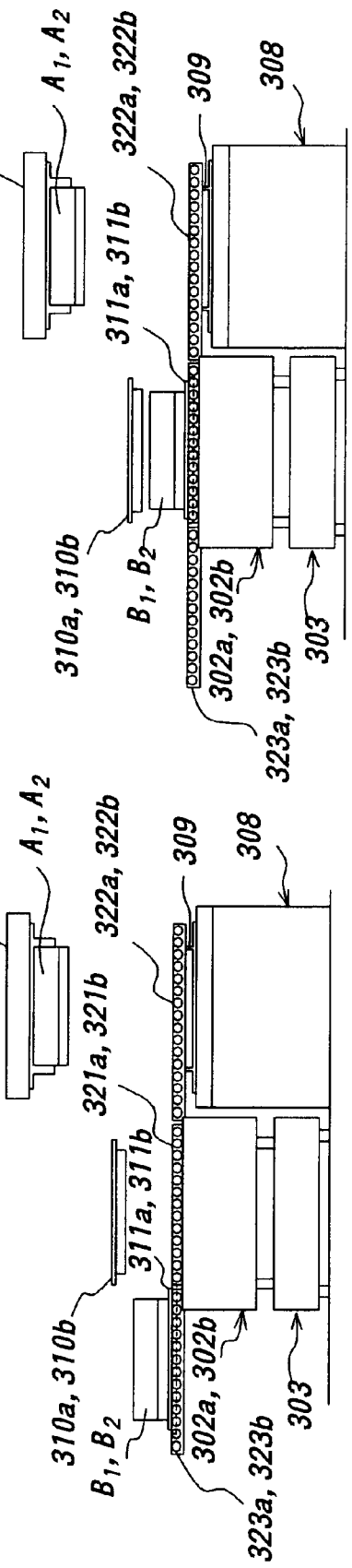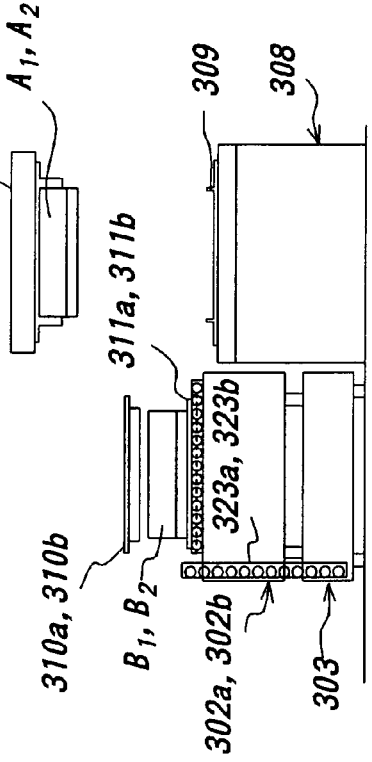

MOLD EXCHANGER SYSTEM FOR TIRE VULCANIZING MACHINE

TECHNICAL FIELD

The present invention relates a mold exchanger system for a tire vulcanizing machine.

BACKGROUND ART

It is known that vulcanization step in the final stage of tire production has to accommodate frequent change in size or type of tires customarily performed in the preceding production stages. In most cases, it is necessary to exchange a tire vulcanizing mold, which is installed in the vulcanizing machine, with a new mold corresponding to the change in size or type of tires.

The vulcanizing molds are significantly heavy articles and, thus it is not very easy to perform handlings and operations as required for mounting such molds into vulcanizing machines or exchanging the previous mold, which is installed in the vulcanizing machine, with a new mold. This applies to the case where the mold is a split-type mold comprised of two mold halves, though the problem is more serious in a segmented-type mold having a more complex structure than the split-type mold. This is because the segmented-type mold is comprised of a number of mold elements for forming the tire tread portion, which are arranged in the circumferential direction.

Therefore, it is a conventional practice that the previous and new molds are transferred by using a fork lift truck, and the removal of the prior mold from the vulcanizing machine and the installation of the new mold onto the vulcanizing machine are performed by using a hoist or a crane. However, these operations involve a number of problems that labors and significant time are required, the productivity of the vulcanizing process is lowered and works are inevitably done for a long time under a high temperature condition.

Thus, JP-A-5-229,643 discloses a system for exchanging the upper and lower molds relative to a plurality of vulcanizing machines, such as a low pressure foundry machine, aiming at automation and labor-saving. The exchanger system is comprised of a primary carriage that is movable along a guide means in front of the vulcanizing machines, a secondary carriage mounted on the primary carriage and carrying the upper and lower molds thereon, and a connector rotatably provided for the primary carriage, wherein the secondary carriage is movable along the connector as it is connected to a corresponding connector fixedly provided for the vulcanizing machine so that the secondary carriage can be moved onto the base member of the vulcanizing machine.

With the mold exchanger system having such a structure, it is practically impossible for the running surfaces on the primary carriage, the running surfaces of the connectors, and the running surfaces of the plurality of, or a number of vulcanizing machines, to be aligned on the same horizontal plane relative to each other. Misalignment of the running surfaces of these elements occurs inevitably, thereby causing troubles when the heavy upper and lower molds are moved onto the base member or the secondary carriage. Moreover, the mold cannot be positioned on the base member with a sufficient accuracy, and this is a significant problem when tire vulcanizing molds are to be transferred, for which a precise positioning plays a decisive role for realizing high quality products.

JP-A-6-315,938 discloses a mold exchanger system which is comprised of a main carriage that is movable along a number of vulcanizing machines, a slider carriage provided on the main carriage and movable toward the vulcanizing machine, and a turntable provided on the slider carriage, wherein the slider carriage carrying the mold is reciprocatingly moved along rails on the turntable and rails within the vulcanizing machine which are connected to each other by connector rails.

Such a mold exchanger system also involves problems that, in order to cause a reciprocating movement of the slider carriage, it is necessary to provide rails inside of the vulcanizing machine, thereby requiring an extensive modification of the machine. The positioning means also involves a problem that it is the slider carriage, not the mold itself, which is positioned relative to the vulcanizing machine and, hence, an accurate centering cannot be achieved.

JP-A-10-6345 discloses a mold exchanger system wherein the previous mold removed from the vulcanizing machine is returned to a stock site, and a next mold selected at the stock site is installed into the vulcanizing machine. The exchanger system is comprised of upper and lower mold supports forming a pair, an elevating means for the pair of the supports, and a lifter for moving the supports to and from the vulcanizing machine, wherein the supports are moved by the lifter to an exchanging position.

Such an exchanger systems is superior to the former two types in that the existing vulcanizing machines can be used as they are, without requiring modification of the machines, and that the mold can be exchanged smoothly. However, in connection with the precise positioning of the mold itself, it is desirable to improve the system since it is the exchanger system itself which is positioned relative to the vulcanizing machine. It is also desirable to improve the system since the system as a whole has a complicated structure and is thus costly, besides that the exchange of the mold requires a relatively long time.

In any of the prior art system explained above, the function of the system is insufficient when the mold is of segmented-type, wherein it is desired to remove the used mold from the vulcanizing machine easily and quickly, and precisely transfer a next mold to the vulcanizing machine. This is because the segmented mold is comprised of two elements, i.e., a mold main body which is relevant to the vulcanization and profiling of the tire, and a container enclosing the mold main body.

The mold main body is comprised of a number of radially movable mold elements for forming the tire tread portion, an upper side mold portion and a lower side mold portion. On the other hand, the container serves to separate the mold elements by causing them to move radially outwards, and integrating the mold elements by causing them to move radially inwards. Thus, the segmented-type mold has a more complicated structure as compared to the split-type mold, and it is more difficult to achieve a facilitated and precise transfer of the segmented-type mold.

SUMMARY OF THE INVENTION

It is therefore a primary object of the present invention to eliminate the above-mentioned problems of the prior art.

It is a more specific object of the present invention to provide a mold exchanger system having a simple structure, which allows a precise centering and positioning of the mold relative to the vulcanizing machine, allows the mold to be transferred to the vulcanizing machine and removed therefrom in a smooth and facilitated manner, and allows improvement in the mold exchanging efficiency by significantly reducing the transfer time and removing time.

To attain the above-mentioned object, according to the present invention, there is provided mold exchanger system comprising a transfer means for transferring into a vulcanizing machine a mold arranged on outside of the vulcanizing machine, and transferring the mold arranged inside of the vulcanizing machine to outside thereof, and a mount for supporting the transfer means, wherein said transfer means comprises a height adjusting means for adjusting the transferring height of the mold, and a positioning means for positioning the mold relative to the vulcanizing machine.

The transfer means in the mold exchanger system according to the present invention may comprise a body that is connected to its mount, a first conveyor fixedly secured to the body, and a second conveyor that can be moved between a position adjacent to the first conveyor on the body and a position inside of the vulcanizing machine. In this instance, transfer means may comprise a movable mould mount plate to be carried by the first and the second conveyors. Also, the transfer means may comprise a drive means for reciprocatingly moving the mold mount plate between said body in the transfer means and inside of the vulcanizing machine.

The height adjusting means in the mold exchanger system according to the present invention may comprise a motor and a jack which can be elevated as it is driven by the drive motor, said jack having a top end which is connected to the body of the transfer means. In this instance, the jack of the height adjusting means may have an elevating stroke that corresponds to the sum of a level difference between the reciprocating movement of the second conveyor and its abutment with a vulcanizing machine, and a difference in mounting height between the molds of a plurality of vulcanizing machines.

The positioning means in the mold exchanger system according to the present invention may comprise a positioning register for the mold, that is arranged at a center in an upper surface of the mold mounting plate, a plurality of notches arranged at side edge locations of the mold mounting plate on the side of the vulcanizing machine, and a plurality of positioning members which are situated on a back side of the vulcanizing machine and engageable with the respective notches.

Alternatively, the positioning means in the mold exchanger system according to the present invention may comprise a positioning register for the mold, that is arranged at a center in an upper surface of the mold mounting plate, a plurality of notches arranged at an outer peripheral surface of mold on the side of the vulcanizing machine, and a plurality of positioning members which are situated on a back side of the vulcanizing machine and engageable with the respective notches.

In any case, the positioning members situated on the back side of the vulcanizing machine may be arranged on the same circumference of a lower holder of the vulcanizing machine.

In the mold exchanger system according to the present invention, it is preferred that two sets of said transfer means are arranged in pair on the same mount, and associated with a distance adjusting mechanism for adjusting a distance of said transfer means relative to each other.

The mold exchanger system constructed as above can be positioned relative to a vulcanizing machine in which two molds are mounted side by side as seem from a front side of the vulcanizing machine. In this instance, the transfer means of the pair may be opposed to each other in a direction in which the two molds of the vulcanizing machine are arranged.

Also, the distance adjusting mechanism may comprise a moving means for reciprocatingly moving at least one of the transfer means in the opposing direction. In this instance, the moving means may comprise a guide means for guiding said movement of said one of the transfer means, and a drive means for moving said one transfer means while being guided by said guide means. Furthermore, the drive means for the transfer means may comprise a ball-screw mechanism having a nut that is fixedly secured to the transfer means, and a motor for driving a male screw of the ball-screw mechanism. Also, the distance adjusting mechanism may comprise a controller for controlling a rotating direction and a rotating speed of said motor based on a data representing the distance between the two molds in the vulcanizing machine and also on a data representing the distance between a center axis position of one of the molds and a reference point of the positioning means.

In the mold exchanger system according to the present invention, the pair of transfer means may each comprise a height adjusting means for adjusting the transfer height of the mold to be mounted. In this instance, the height adjusting means may comprise a motor fixedly arranged on the support, two pairs of corner jacks on the support, that can be driven by the motor and thereby elevated, a frame connected to top ends of elevating portions of the jacks, and a moving means in the distance adjusting mechanism, that is arranged on the frame. The frame of said height adjusting means may comprise sliding members engageable with respective guide members which project vertically from four corners of the support, said sliding members being connected to the top ends of the elevating portions of the jacks.

In the mold exchanger system according to the present invention, the transfer means forming the pair may each comprise a first conveyor fixedly arranged in a direction perpendicular to said opposing direction, and a second conveyor that can be moved between a position adjacent to the first conveyor on the body and a position inside of the vulcanizing machine. In this instance, the transfer means may each comprise a movable mold mount plate to be carried by the first and the second conveyors.

In the mold exchanger system according to the present invention, the transfer means forming the pair may each comprise a mold positioning means for positioning the mold, which is being transferred, in a direction toward inside of the vulcanizing machine. In this instance, the mold positioning means may comprise a notch formed in the mold mount plate and engageable with a positioning member provided at inside of the vulcanizing machine, and a mold centering register provided for the mold mount plate.

In the mold exchanger system according to the present invention, it is preferred that the transfer means comprises a pair of mount portions foe individually mounting two molds which are aligned in the same transfer direction, a transfer mechanism for individually moving the mount portions one by one, in its access position to and from the lower part of the vulcanizing machine, and an elevating means for moving one of the mount portions vertically between said access position level and a higher level.

The elevating means may be arranged such that it is in engagement with said one of the mount portions during its upward movement, and disengaged from said one of the mount portions after completion of its downward movement.

The elevating means may have a vertical stroke such that one of the mount portions carrying a mold can be passed through a lower side of another mount portion which is situated in its higher level.

With reference to the moving mechanism, the transfer means may comprise a first conveyor fixedly arranged with reference to said support, a second conveyor that can be moved between a position adjacent to the first conveyor on the body and a position inside of the vulcanizing machine, and a third conveyor that is arranged behind said first conveyor. In this instance, the third conveyor may have a rotational center at a rear upper side of the transfer means and is rotatable between a lateral position in which it is aligned in the same direction as the first conveyor, and a longitudinal position on the rear side of the transfer means. One of the mount portions may be movable in the transfer direction above the first and second conveyors, with the other of the mount positions movable in the transfer direction above the first and third conveyors. At least one pair of said elevating means may be arranged adjacent to, and on both sides of the first conveyor.

In the mold exchanger system constructed as above, the mount portions may each comprise a mold positioning register. Also, the support of the transfer means is comprised of a movable carriage having the height adjusting means for adjusting the height of the transfer means. The carriage may be arranged so as to support thereon a pair of said transfer means that are arranged adjacent to each other in the moving direction of the carriage.

BRIEF DESCRIPTION OF THE DRAWINGS

The present invention will be explained below in further detail, with reference to the preferred embodiments shown in the drawings, in which:

FIGS. 11(a) to 11(h) are explanatory views showing the successive steps (a) to (h) for transferring the mold main body to the vulcanizing machine by means of the mold exchanger system according to the first embodiment;

FIGS. 12(a) to 12(h) are explanatory views showing the successive steps (a) to (h) for removing the mold main body from the vulcanizing machine and transferring the same by means of the mold exchanger system according to the first embodiment;

FIGS. 22(a) to 22(o) are explanatory views showing the successive step (a) to (o) of the mold exchanging process with the exchanger system according to the third embodiment.

BEST MODE FOR CARRYING OUT THE INVENTION

Figure 1:
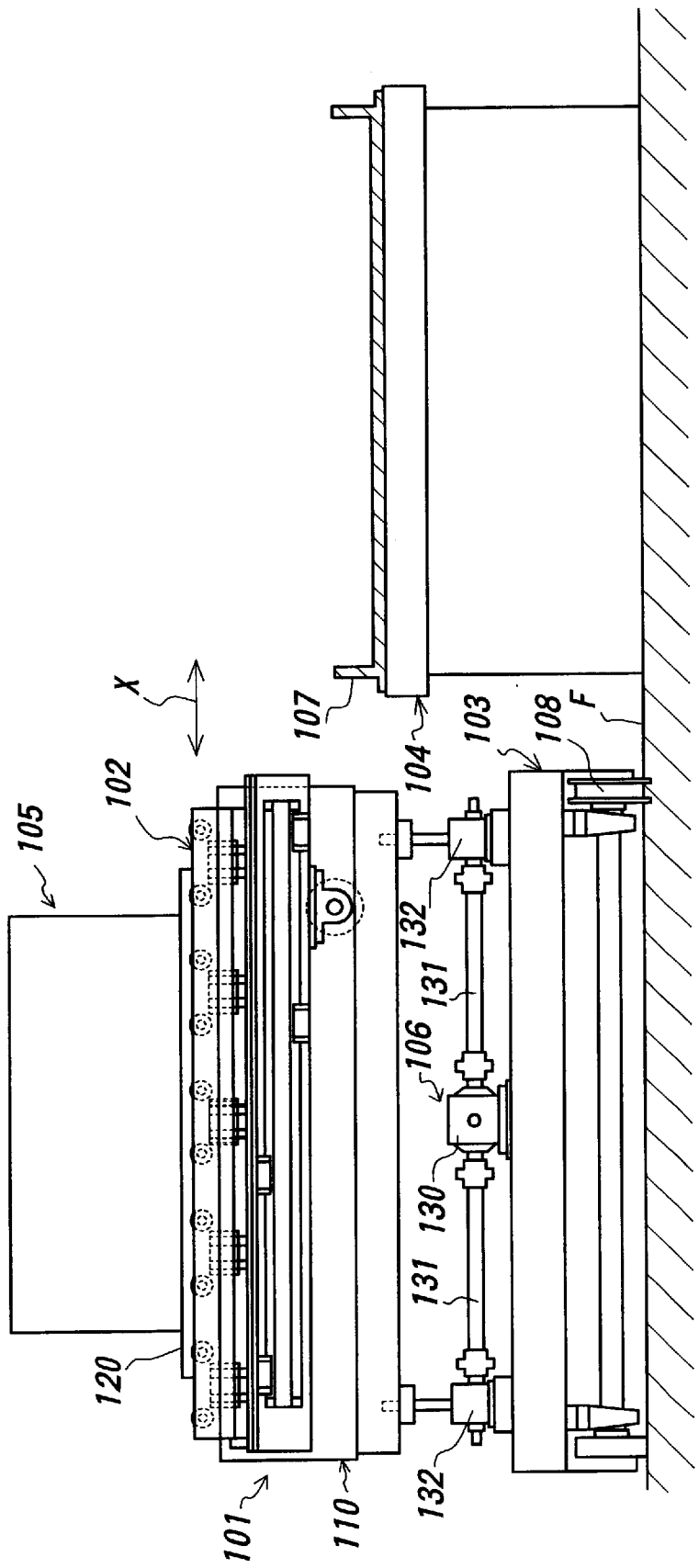
FIG. 1 is a side view showing the major part of a mold exchanger system according to a first embodiment of the present invention, together with the mold and the lower part of the vulcanizing machine.

The present invention will be more fully described below with reference to the preferred embodiments shown in the drawings.

Structure of First Embodiment

FIGS. 1 to 10 shows a mold exchanger system 101 according to a first embodiment of the present invention, which includes a transfer mechanism 102 and a support 103 for supporting the transfer mechanism 102. The mold exchanger system 101 is situated on the front side, i.e., on the operator's side of a vulcanizing machine 104, of which only the lower portion is shown, and is preferably movable as being guided by tracks which are spaced by a predetermined distance from a plurality of vulcanizing machines 104 that are arranged side-by-side. The mold exchanger system 101 serves to transfer a mold 105 mounted on the transfer device 102 into inside of the vulcanizing machine 104, and to remove a mold 105 (not shown) installed inside of the vulcanizing machine 104 to an external transfer device 102 and transfer it to a predetermined location.

The mold 105 on the transfer device 102 is normally situated at a height adjacent to the transfer position of the vulcanizing machine 104, wherein the height is measured with reference, for example, to the floor surface F. This is a rational measure since there is more or less difference in the height of the lower portions of a plurality of vulcanizing machines that are arranged side-by-side. To this end, the transfer device 102 is provided with a height adjusting means 106 for adjusting the transfer height of the mold 105 within a small range. The details of the height adjusting means 106 will be explained hereinafter.

The provision of the height adjusting means 106 ensures that the mold 105 is efficiently transferred onto the lower portion of the vulcanizing machine 104, i.e., onto the lower holder 107 in the illustrated embodiment, and efficiently removed from the lower portion of the vulcanizing machine 104 onto the transfer device 102, without requiring an excessive elevating movement and operational time therefor.

The transfer device 102 is further provided with a positioning means for positioning the mold 105 relative to the lower portion of the vulcanizing machine 104. The details of the positioning means will be explained hereinafter. Since the mold 105 is a significantly heavy article, the centering of the mold 105 once it has been installed into the vulcanizing machine requires a prolonged installation time and a prolonged non-operation time of the vulcanizing machine. However, these problems can be eliminated by the provision of the positioning means.

With the mold exchanger system as described above, when the mold 105 on the transfer device 102 is to be transferred onto the lower portion of the vulcanizing machine, or when the mold is removed from the lower portion of the vulcanizing machine and transferred onto the transfer device 102, it is possible to significantly improve the operability and significantly reduce the operation time. Incidentally, it is preferred that the support 103 is comprised of a carriage that is guided along a predetermined track, e.g., as a carriage with wheels 108.

The details of the transfer device 102 will be explained below.

As shown in FIGS. 2 to 6, the transfer device 102 is provided with a body 110 that is connected to the support 103, a pair of first conveyors 111 that are fixedly secured to the body 110, and second conveyors 112. The conveyors 112 are situated on the inner side of the first conveyors 111 and reciprocatingly movable between a position in which they are adjacent to the conveyors 111 on the body 110 and the lower holder 107 of the vulcanizing machine 104. These conveyors 111, 112 extend in parallel with each other. The second conveyor in the illustrated embodiment includes a set of two conveyors 112 forming a pair, though the provision of one or more conveyors would be sufficient.

The conveyors 111, 112 are not particularly limited in type, provided that they are suitable for the transfer of heavy articles, and they comprised of ordinary roller conveyors in the illustrated embodiment.

The upper edges of the rollers in the conveyors 111, 112 are arranged in the same horizontal plane. The conveyor 112 is reciprocatingly moved by operating a motor 114 in the direction indicated by a double arrow X. The conveyor 112 in FIG. 2 assumes a positions in which its rearward movement has been completed, while the conveyor 112 in FIGS. 5 and 6 assumes a possible in which its forward movement has been completed.

To cause a reciprocating movement of the conveyor 112, as shown in the drawings, the conveyor 112 can be provided with a driving mechanism that is comprised of a pinion 115 arranged at the output shaft of the motor 114, a rack 116 meshed with the pinion 115, a chain 117 carried by the rack 116, and a pair of sprockets 118 for reversing the moving direction of the chain 117. The driving mechanism is not particularly limited in type, and may be replaced by other actuator mechanism suitable for a reciprocating mechanism.

The transfer device 102 includes a plate 120 that can be movably mounted on the pair of conveyors 111 and the pair of conveyors 112 at their positions after completion of rearward movement. For the sake of convenience, the plate 120 is shown in FIGS. 2 to 6 by imaginary line. As shown in FIG. 1, the plate 120 serves to directly support the mold 105 thereon. As further shown in FIG. 2, the plate 120 is provided with a positioning register 121 for the mold 105 at its center region of the upper surface. The register 121 has an outer peripheral surface that corresponds to the innermost peripheral surface of the mold 105.

The plate 120 is attached to a reciprocating member 122 such that it can be readily detached therefrom. This attachment is performed simply by fitting the inner peripheral surface of the register 121 over the outer peripheral surface of a cylindrical projection provided on the forward end side of the reciprocating member 122. A clearance is formed between the lower surface of the plate 120 and the upper surface of the reciprocating member 122, so that the plate 120 by its own weight is brought into contact with the upper edges of the rollers of the conveyors 111, 112. If necessary, the plate 120 may be threadedly connected to the reciprocating member 122.

As in the above-mentioned conveyor 112, the reciprocating member 122 has a driving mechanism for causing its reciprocating movement in the direction indicated by the double arrow X. This mechanism is comprised of a motor 124, two pinions 125a, 125b, a rack 126, a chain 127 and a pair of sprockets (not shown). The driving mechanism is not particularly limited in type, and may be replaced by other suitable actuator mechanism. Due to the fitting engagement between the register 121 and the cylindrical projection 123, it is possible to cause a reciprocating movement of the plate 120 between the body 110 and the lower holder 107 of the vulcanizing machine 104 (see, FIGS. 2 and 6).

With reference to FIG. 1, the height adjusting means 106 provided for the transfer device 102 is comprised of a motor 130, a shaft 131 connected to the output shaft of the motor 130, and a jack 132 which can be elevated by the rotation of the shaft 131. The jack 132 has a top end that is connected to the lower portion of the body 110. In view of the arrangement of the motor 130 and a stable support of the heavy mold 105, it is preferred that at least one pair, more preferably two pairs, of the jacks 132 are provided at both end portions of the body 110.

Figure 4:
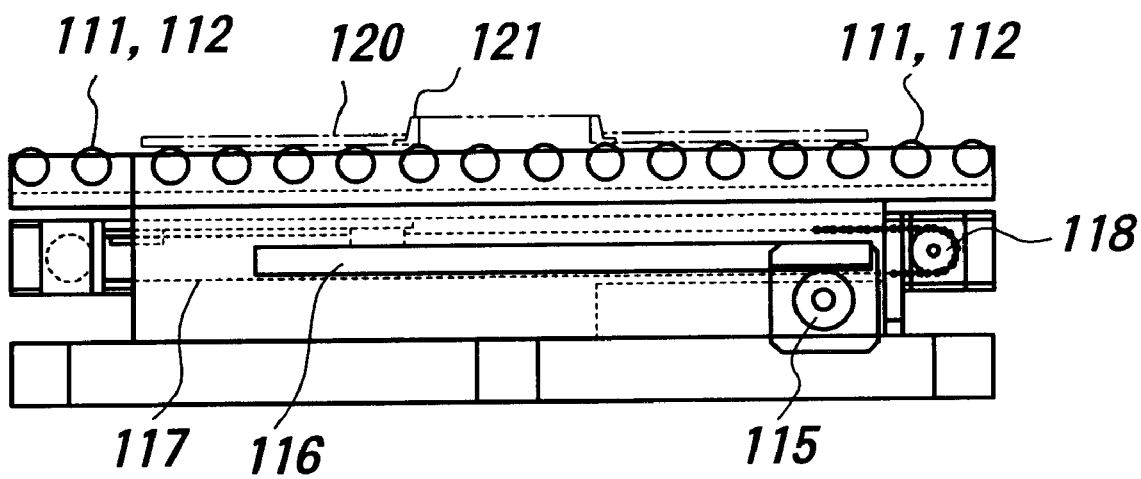
FIG. 4 is a side view showing the transfer mechanism before the forward movement of the second conveyor in the mold exchanger system.
Figure 5:
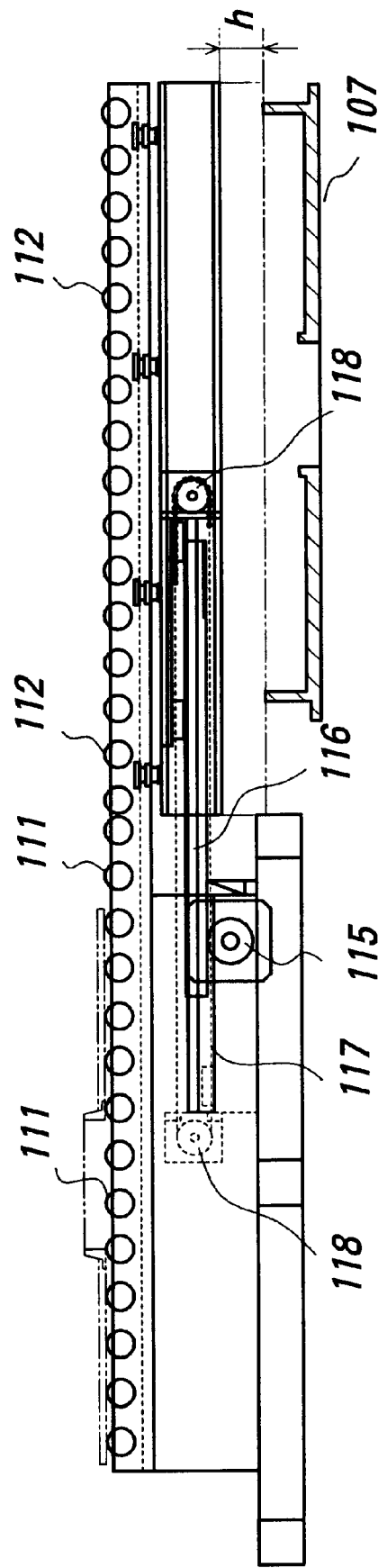
FIG. 5 is a side view showing the transfer mechanism after the forward movement of the second conveyor.

FIG. 4 shows the second conveyor 112 in a position after completion of the rearward movement, while FIG. 5 shows the second conveyor 112 in a position after completion of the forward movement. The second conveyor 112 shown in FIG. 5 is lowered to a position indicated by imaginary line by an amount h (mm) and supported on the upper surface of the lower holder 107. Thus, it is necessary that the jack has an elevating stroke that corresponds at least to the amount h (mm) shown in FIG. 5. Incidentally, it is noted that the amount h (mm) corresponds to the difference between the height for allowing a reciprocating movement of the second conveyor 112 relative to the lower portion of the vulcanizing machine 104, and the height of the position where the second conveyor 112 is in abutment with the upper surface of the lower holder 107.

It is to be further noted that the height of the lower portions of a plurality of vulcanizing machines, to which a single transfer device is assigned, i.e. the mounting height of the mold 105, is not precisely constant. Thus, it is necessary for the jack 132 to have an elevating stroke h+α (mm) the corresponds to the above-mentioned stroke h (mm) and the difference α (mm) in the mounting height of the mold 105. The elevating movement within such a stroke is well within the range of height adjustment that can be performed in a very short time, thereby contributing to improve the operability.

Figure 2:
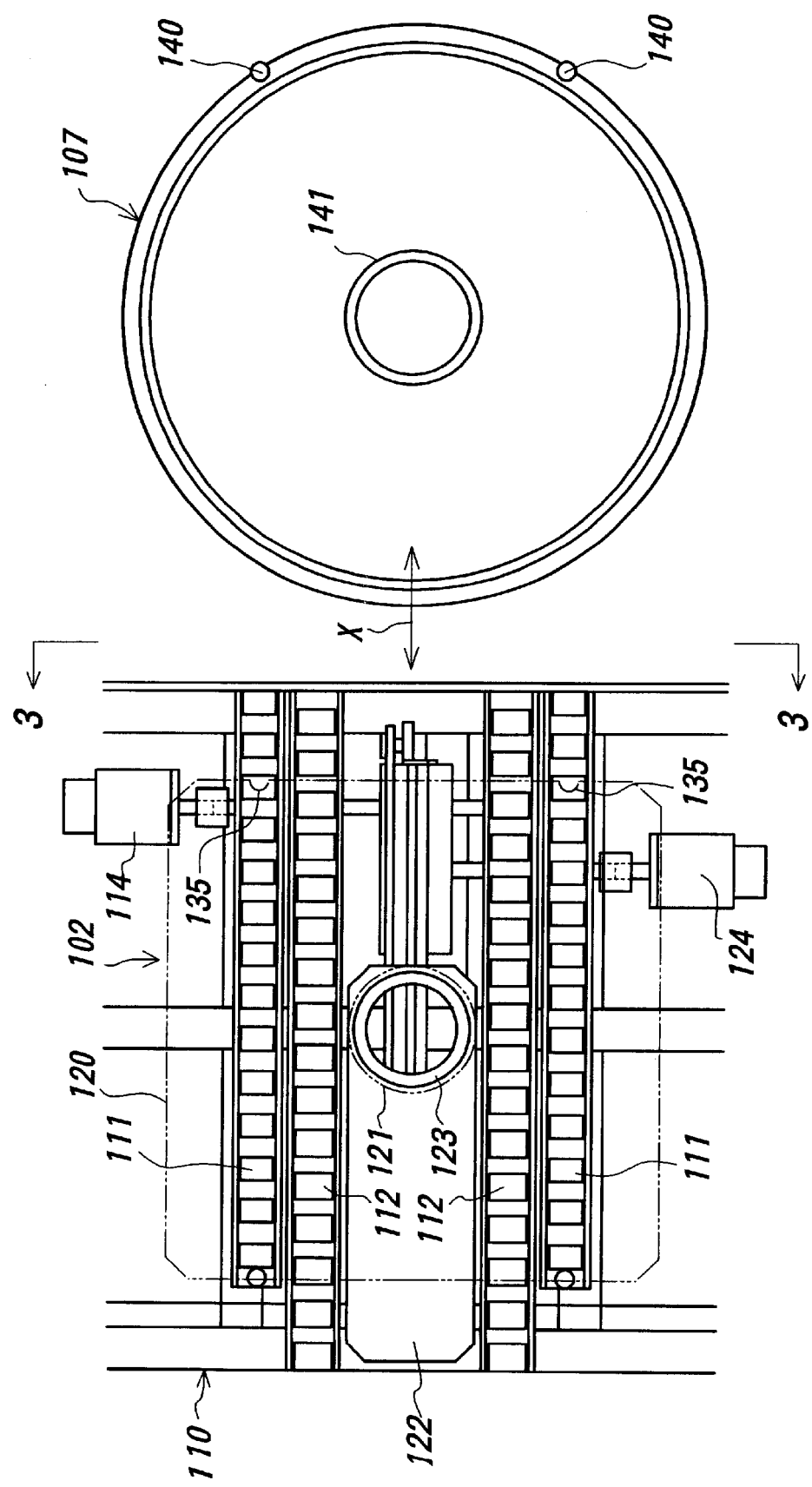
FIG. 2 is a top plan view showing the transfer mechanism of the mold exchanger system together with the lower part of the vulcanizing machine and the lower holder.
Figure 6:
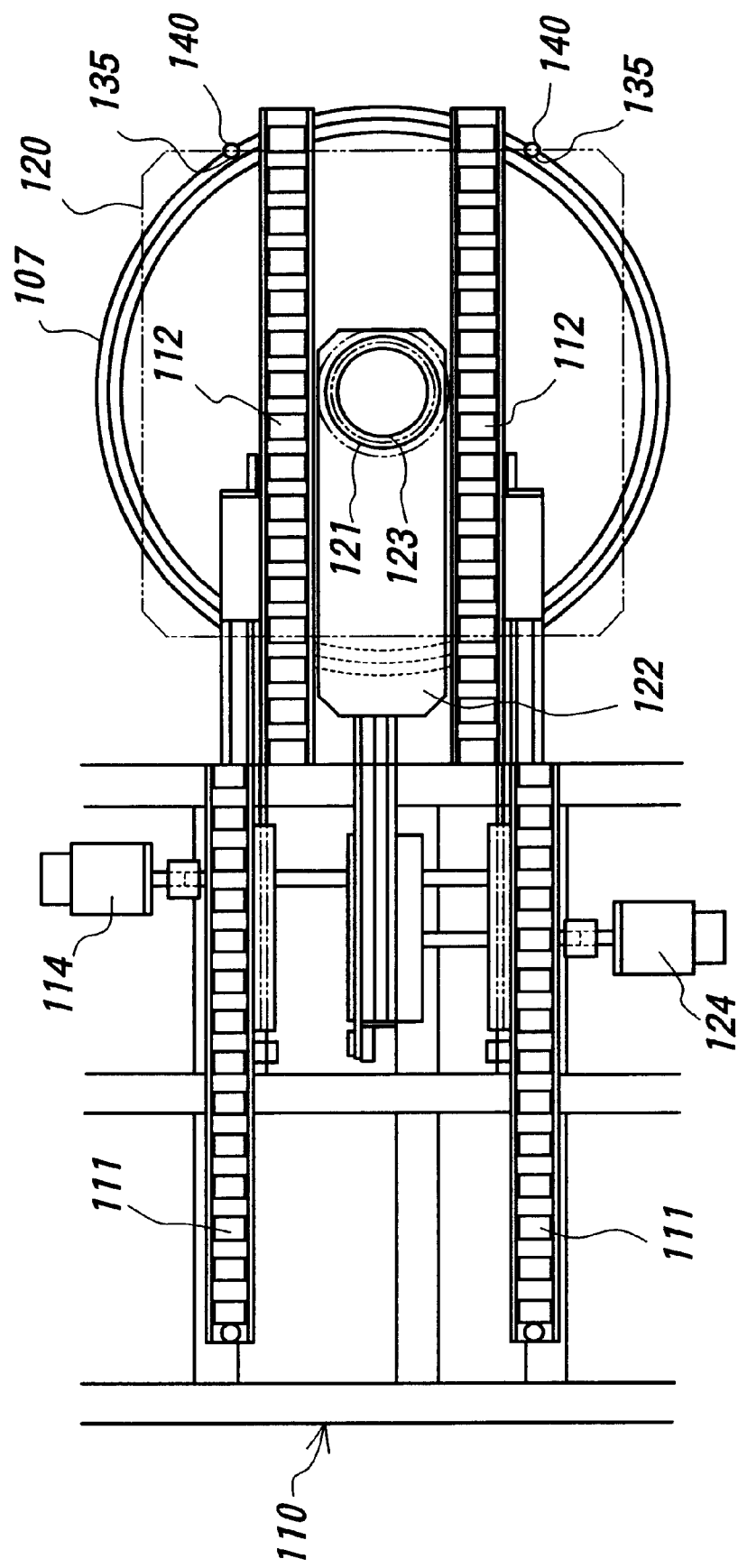
FIG. 6 is a top plan view showing the second conveyor and the mold mounting plate after their forward movement.

Both on the side of the transfer device 102 and on the inside of the lower portion of the vulcanizing machine, there are provided positioning means which cooperate with each other for achieving the positioning of the mold 105. As shown in FIGS. 2 and 6, the positioning means on the side of the transfer device 102 is comprised of the register 121 on the plate 120, and a plurality of notches 135, i.e., a pair of notches in the illustrated embodiment. The notches 135 each have a predetermined shape suitable for the positioning function, e.g., V-shape or semi-circular shape.

As further shown in FIGS. 2 and 6, the positioning means on the inside of the lower portion of the vulcanizing machine is comprised of a plurality of positioning members 140 projecting from the inside of the lower portion of the vulcanizing machine 104. The positioning members 140 in the illustrated embodiment are in the form of pins projecting from the lower holder 107.

During the forward movement of the plate 120 toward the vulcanizing machine 104, the pair of notches 135 of the plate 120 are brought into engagement with the pair of pins 140 and fitted therewith. At this time point, the movement of the plate 120 is stopped. The pins 140 forming the pair are arranged on the same circumference of the lower holder 107. Incidentally, the lower holder 107 is provided in its center region with a centering register 141 for the mold 105, which is the same as the register 121 of the plate 120.

Alternatively, although not shown in the drawings, the pair of notches 135 of the plate 120 may be replaced by a pair of notches on the outer peripheral surface of the mold 105 which are engageable with corresponding pair of pins that are detachably secured to the lower holder 107. These pins can be detached from the lower holder after suspension of the mold in the manner to be described hereinafter. In this case, the plate 120 may have a width as measured toward the inside of the machine, that is smaller than the illustrated width so that the mold 105 mounted on the plate 120 protrudes from the plate 120. As another alternative approach, the output shaft of the motor 124 as the drive source for the reciprocating member 122 may be provided with an encoder and a brake, which cooperate with each other to position the plate 120 relative to the vulcanizing machine 104.

As explained above, due to the cooperation of the positioning means on the side of the transfer device 102 and the positioning means on the side of the vulcanizing machine, including the register 141 of the lower portion 107, it is possible to position the mold 105 relative to the vulcanizing machine 104 precisely and in a facilitated manner. Also, the mold exchanger system is simple in structure and thus less costly, and can be operated in a short time with an improved reliability.

The mold 105 to be exchanged by the exchanger system 101 may be either a split-type mold comprised of two mold halves, or a segmented-type mold comprised of a mold main body and a container, as explained above. The exchange of the split-type mold is simple so that explanation is omitted. Thus, a brief explanation will be made with reference to FIGS. 7 to 9, of an example of segmented mold that can be suitably combined with the mold exchanger system 101, and an example of the container on the side of the vulcanizing machine, for achieving an operating state and a non-operating state of the mold main body in combination with the mold exchanger system.

Figure 7:
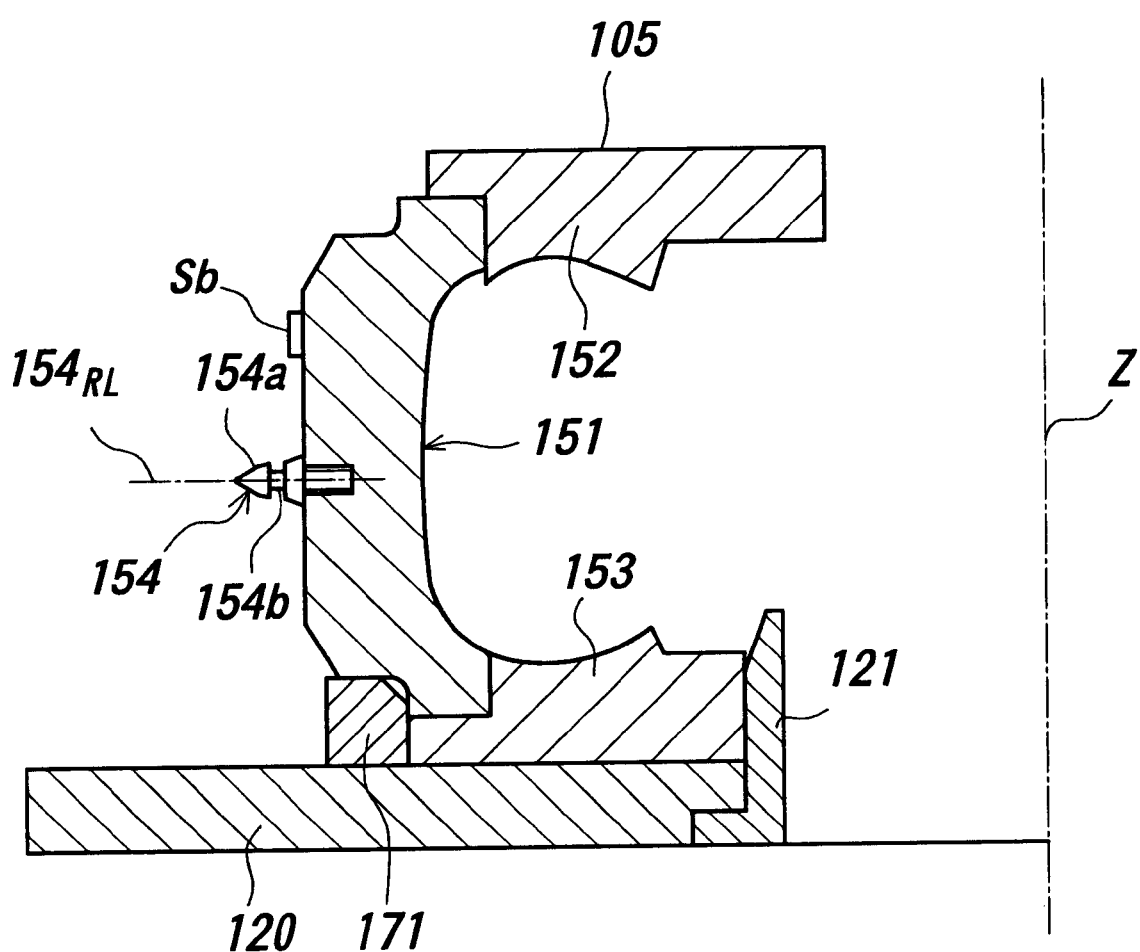
FIG. 7 is a sectional view showing the left half of the mold mounting plate and the mold main body.

As shown in FIG. 7, the mold main body 105 is comprised of a number of mold elements 151 for forming the tire tread portion, which are arranged in the circumferential direction, an upper side mold member 152 and a lower side mold member 153. The mold elements 151 each have parting surfaces that extend in the radial direction.

As for the mold main body 105 mounted on the plate 120, the inner peripheral surface of the lower side mold member 153 is fitted with the outer peripheral surface of the register 121 so that the lower side mold member 153 is accurately positioned on the plate 120 with reference to the center axis Z.

The mold elements 151 are each provided with lock members at both circumferential end portions, in the form of a pair of lock pins 154 which project radially outwards. Each lock pin 154 has a conical or frustum-shaped head portion 154a and a drum portion 154b of a reduced diameter as compared to the head portion 154a.

Figure 8:
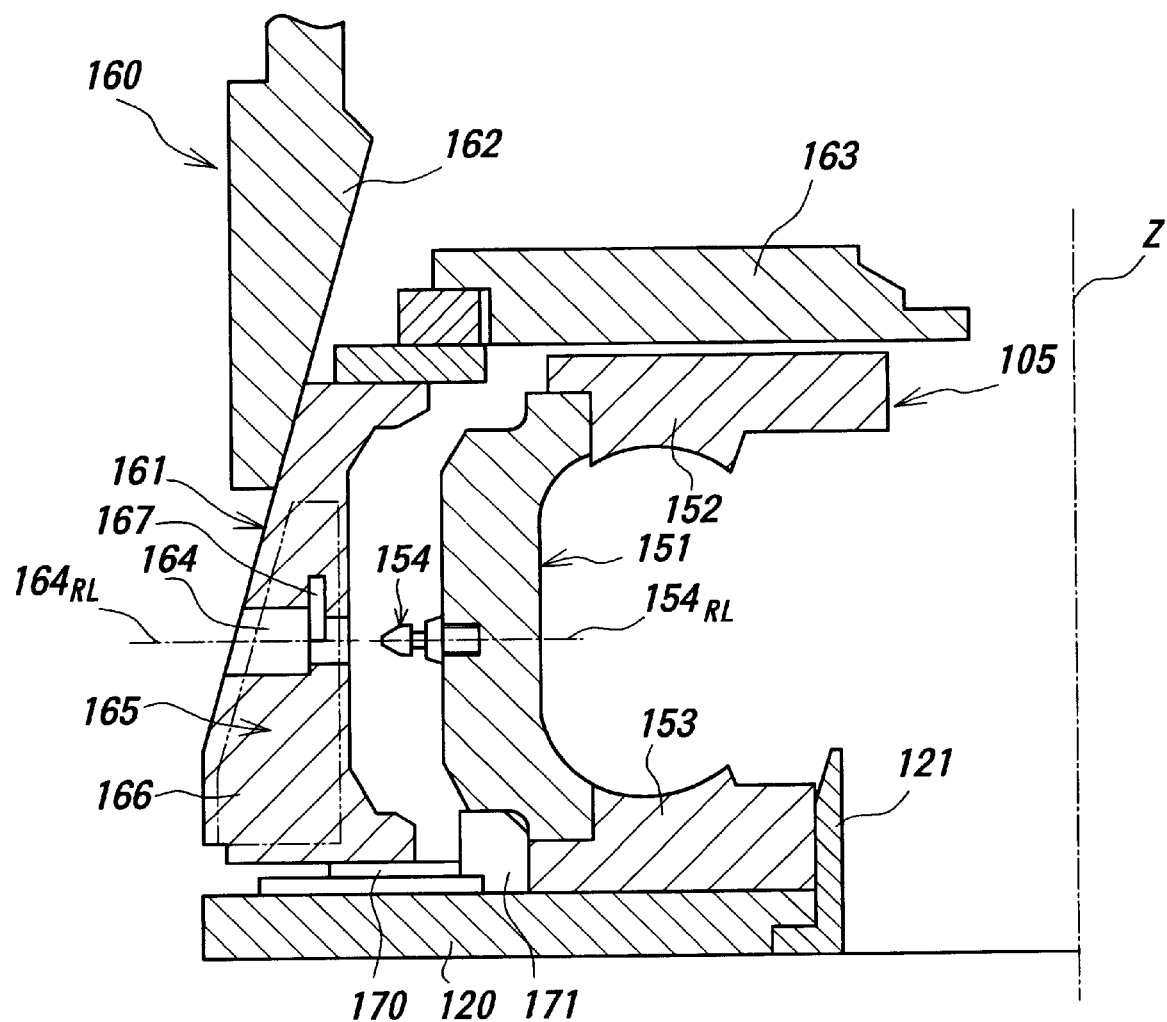
FIG. 8 is a sectional view showing the left half of the mold mounting plate and the mold main body, together with the container in its unlocked state.

As shown in FIG. 8, the container is fixedly connected to the upper portion of the vulcanizing machine 160 and is comprised of the same number of segments 161 as the segment number of the mold elements 151, a container ring for moving the segments 161 radially inwards and outwards, an upper holder 163 and the lower holder 107 (see FIG. 1).

The container ring 162 fixedly connected to the upper portion of the vulcanizing machine 104 is slidably engaged with the taper portion at the rear surface side of the segment 161, and causes the segments 161 to be moved radially inwards or outwards as the upper portion of the vulcanizing machine 104 is mobbed upwards or downwards.

The segments 161 each have a pair of through holes 164 for accommodating the corresponding pair of lock pins 154 when the segment is connected with the corresponding mold element 151. As counterpart lock member, the segments 161 each have a pair of latch means 165 on both sides of the circumferential end surfaces of the segment 161, wherein each latch means is movable in the vertical direction.

The latch means 165 each are comprised of a plate member 166 as indicated by imaginary line, that can be moved vertically upwards and downwards along the circumferential end surface of the segment 161, and a lock arm 167 that extends from the plate member 166 into the inner space of the segment 161. The lock arm 167 has a lower edge which is preferably situated on the extension 164RL of the radial center axis 154RL of the lock pin 154. The extension 164RL coincides with the center axis of the through hole 164.

Figure 9:
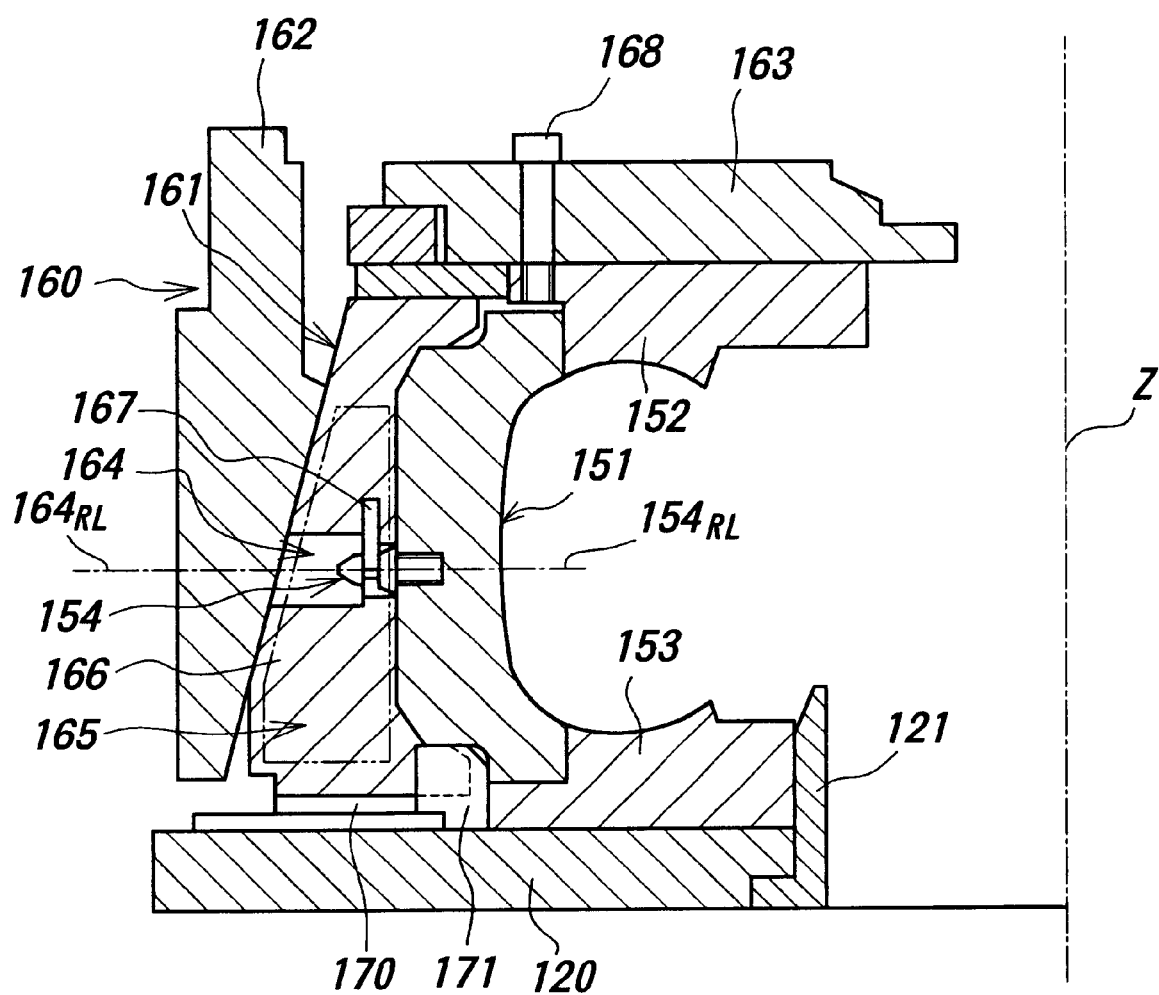
FIG. 9 is a sectional view showing the left half of the mold mounting plate and the mold main body, together with the container in its locked state.

With reference to FIGS. 8 and 9, during the downward movement of the container ring 162 from its position above the vulcanizing machine to the lowermost position, the segments are caused to undergo a sliding movement radially inwards along the upper surface of a guide plate 170 that is provided on the plate 120. On this occasion, the lock arm 167 is moved upwards along the conical surface or the side surface of frustum shape at the head portion 154a of the lock pin 154, and drops into engagement with the barrel portion 154b after it has passed the head portion 154a.

The lock arm 167 dropped into the barrel portion 154b automatically achieves a locking engagement with the lock pin 154 so that the mold element 151 is integrated with the corresponding segment 161. This integrated state is shown in FIG. 9 together with the fixed state by means of bolts 168. Incidentally, a block 171 for stably supporting the lower surface of the mold element 151 is preferably provided at a region of the plate 120, where the movement of the segment 161 is not impeded.

In order to positively ensure achievement of the automatic locking engagement as explained above, it is preferred that the latch means 165 is provided with a compression resilient member, e.g., a compression coil spring, that is engaged with the upper surface of the plate member 166, and/or a tensile resilient member, e.g., a tensile coil spring, that is engaged with the lower surface of the plate member 166.

For achieving the locking engagement, it is necessary to for the latch means 165 to be moved relative to the stationary lock pin 154. The means for achieving such a relative movement may be comprised of the container ring 162 for moving the segments 161 radially inwards, and the guide plate 170 for precisely guiding the sliding movement of the segments 162 radially inwards.

Figure 10:
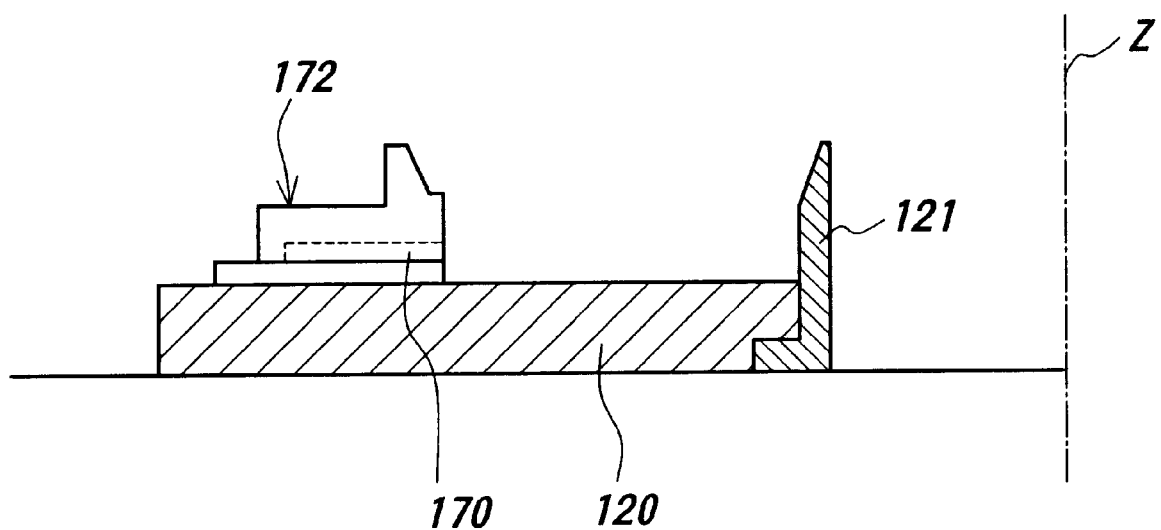
FIG. 10 is a sectional view showing the left half of the mold mounting plate having an unlocking block.

On the other hand, in order to unlock the latch means 165 from the lock pin 154, as shown in FIG. 10, a number of unlock blocks 172 are provided on the plate 120. These blocks 172 on the plate 120 each serve to cause an upward movement of the associated plate members 166 and maintain it in the lifted position. The number of the blocks 172 is the same as that of the segments 161. The blocks 172 are each situated within the circumferential gap between the neighboring segments 161 when they assume a position as shown in FIG. 9.

As mentioned above, it is possible to simply and precisely transfer and remove the segmented-type mold essentially in the same manner as a split-type mold, by providing the segmented-type mold with an automatic locking means and an automatic unlocking means, as well as means for causing a relative movement between the lock pin 154 of the mold main body 105 and the latch means 165 of the container 160.

Operation of the First Embodiment

The mold exchanger system 101 can be suitably used to transfer and install the mold 105 relative to the vulcanizing machine 104 in the manner which will be explained below with reference to FIGS. 11(*a*) to 11(*h*), assuming that the mold to be transferred is comprised of the mold main body 105 shown in FIGS. 7 to 10. It is noted that FIGS. 11(*a*) to 11(*h*) schematically illustrate the successive steps (a) to (h) of the transfer and installation process of a new mold main body 105 relative to the lower portion of the vulcanizing machine 104. In these figures, the hatching lines representing the sections are omitted for the sake of simplicity.

Figure 11G:
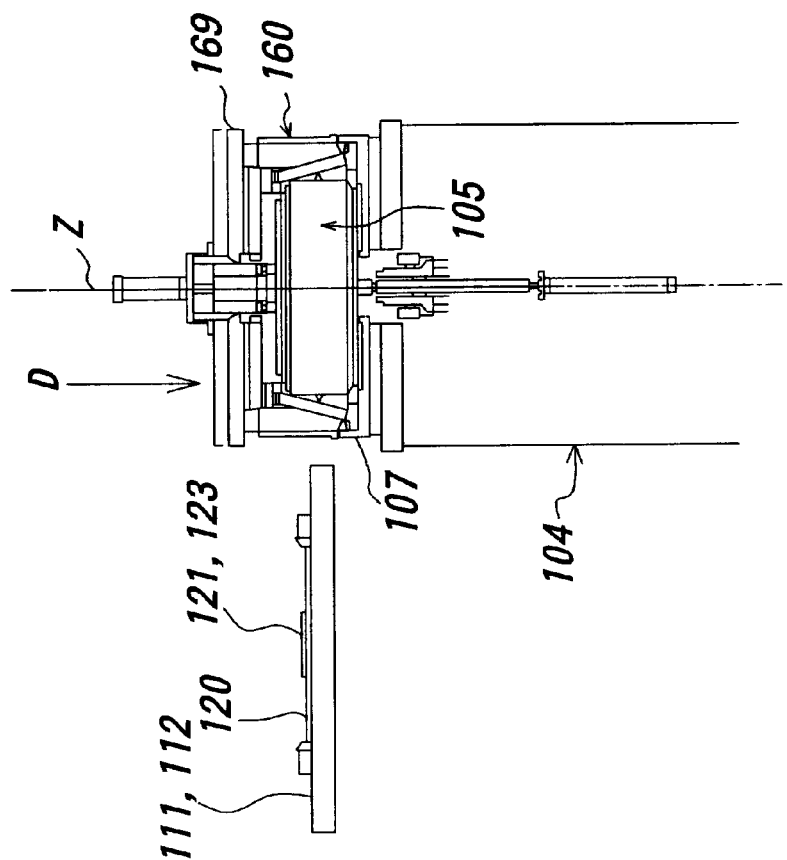
Figure 11H:
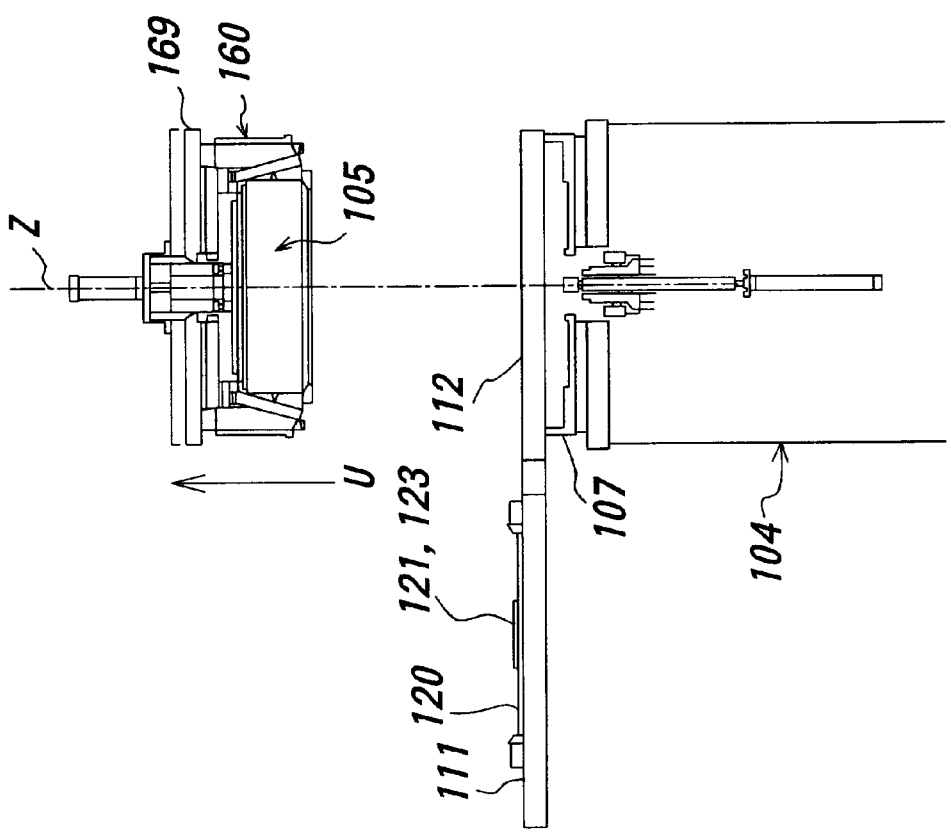

In the step (a) shown in FIG. 11(*a*), the mold exchanger system 101 which is shown only partly is stopped in front of the vulcanizing machine 104, with the mold main body 105 mounted on the plate 120 of the transfer device 102 and centered and positioned relative to the lower holder 107 of the vulcanizing machine 104 and maintained in its stopped position. On this occasion, as shown in FIG. 5, the height adjusting means 106 (FIG. 1) is operated so that the second conveyor 112 is situated at a position higher by an amount h (mm) than its position where it is in abutment with the lower holder 107.

Figure 3:
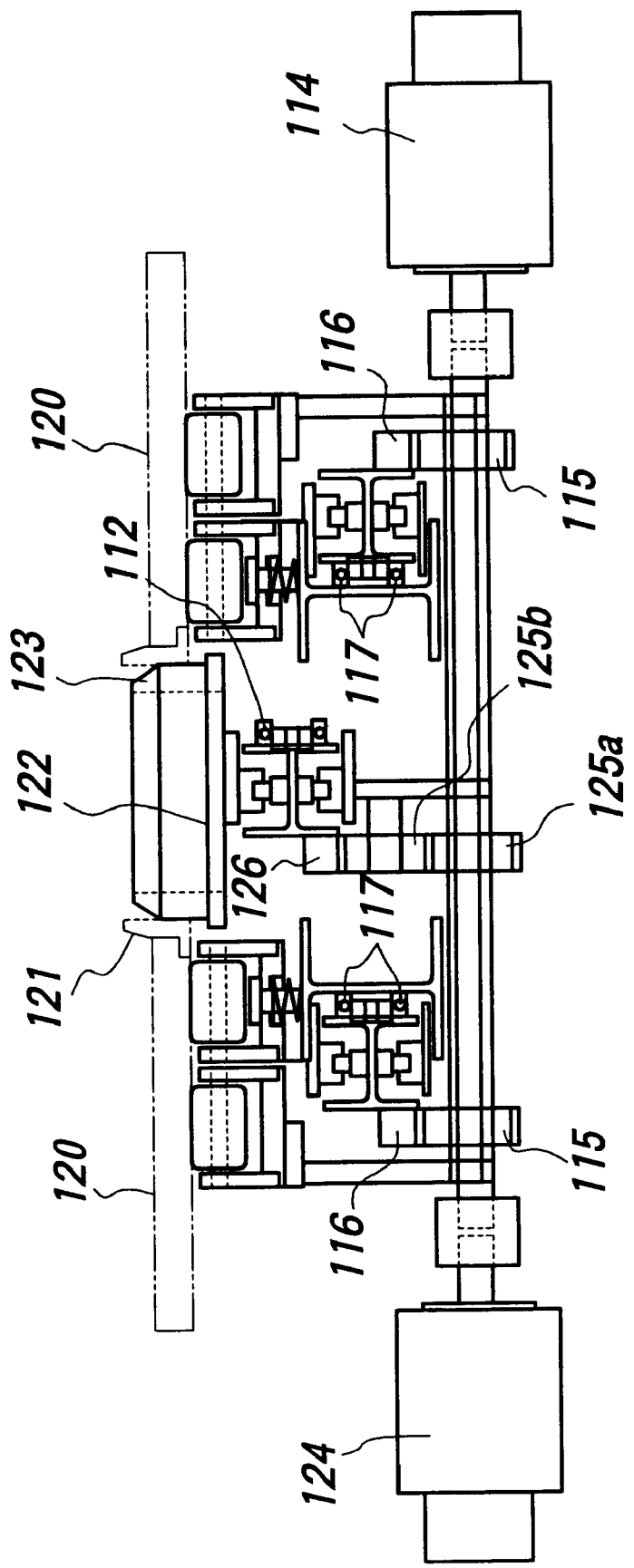
FIG. 3 is a front view of the transfer mechanism as seen in the direction of arrow 3—3 in FIG. 2.

In the step (b) shown in FIG. 11(*b*), the drive means 114 to 118 shown in FIGS. 3 to 5 are operated so that the second conveyor 112 of the transfer device 102 is moved to the rearward position to the forward position where the second conveyor bridges over the lower holder 107 of the vulcanizing machine 104. Subsequently, the height adjusting means 106 is operated to drive the jack 132 (FIG. 1) downwards, to thereby cause a downward movement of the second conveyor 112 by the above-mentioned amount h (mm), so that the conveyor 112 is brought into abutment with the lower holder 107 to complete preparation of transfer and support of the mold main body 105 by means of the conveyor 112.

In the step (c) shown in FIG. 11(*c*), the drive means 124 to 127 are operated as shown in FIG. 3, to cause a forward movement of the plate 120 mounting the mold main body 105 thereon. On this occasion, the pair of notches 135 of the plate 120 are engaged with the corresponding pair of pins 140 as shown in FIG. 6, to position the mold main body 105. The mold main body 105 so positioned has a center axis Z which coincides with the respective center axes Z of the vulcanizing machine 104 and of the container 160 which can be elevated and situated above the vulcanizing machine 104. Incidentally, the heavy mold main body 105 is supported by the lower holder 107 of the vulcanizing machine 104 without giving rise to problems, not only during the transfer, but also even after completion of the transfer.

In the step (d) shown in FIG. 11(*d*), the container 160 is then moved downwards. FIG. 11(*d*) shows the state during the downward movement, wherein each segment 161 has been just brought into contact with the upper surface of the guide plate 170 on the plate 120 (FIGS. 8 and 9). It is noted that, from the state shown in FIG. 11(*a*) to the state shown in FIG. 11(*d*), the segments 161 are suspended from the container ring 162. Upon further downward movement of the container 160 and the container ring 162, the segments 161 are caused to undergo sliding movement radially inwards.

In the step (e) shown in FIG. 11(*e*), the movement of the segments 161 radially inwards has been completed so that the mold main body 105 is integrated with the container 160. When the movement of the segments 161 radially inwards has been completed, the arms 167 of the latch means 165 of each segment 161 automatically achieve locking engagement with the pins 154 of the corresponding mold element 151.

At the same time, by means of the lock-engaging body 168 provided for the upper holder 163 of the container 160, the top plate 169 of the container 160 and the upper side mold member 152 are automatically locked with each other through the upper holder 163. Under the two types of locking engagement as explained above, the mold main body 105 and the container 160 are integrated with each other in the vertical direction during the operation, by means of the supporting projections extending from the segments 161 toward the corresponding mold elements 151.

In the step (f) shown in FIG. 11(*f*), the container 160 functioning also as a suspension means is moved to temporarily lift the mold main body 105 and the segments 161 vertically in the direction indicated by arrow U. Subsequently, in the step (g) shown in FIG. 11(*g*), the table 120 is moved back to the transfer device 102.

In the step (h) shown in FIG. 11(*h*), the height adjusting means 106 is operated to drive the jack 132 slightly upwards and thereby cause an upward movement of the conveyor 112 by the predetermined amount h (mm), and the conveyor 112 is then moved back to the transfer device 102. Finally, the container 160 is moved downwards as shown by arrow U, to mount the mold main body 105 and the container 160 onto the lower holder 107 of the vulcanizing machine 104. By this, the transfer of the mold main body 105 and the container 160 to the lower portion of the vulcanizing machine 104 is completed.

As explained above, it is possible to transfer the mold main body 105 to the lower portion of the vulcanizing machine 104 in a smooth and facilitated manner, under a precisely positioned condition and within a short time.

The mold exchanger system 101 can be suitably used also to remove the mold 105 from the vulcanizing machine 104 in the manner which will be explained below with reference to FIGS. 12(*a*) to 11(*h*), assuming that the mold to be transferred is comprised of the mold main body 105 shown in FIGS. 7 to 10. It is noted that FIGS. 12(*a*) to 11(*h*) schematically illustrate the successive steps (a) to (h) of the process for removing the mold main body 105, which is installed in the lower portion of the vulcanizing machine 104, and transferring it to the transfer device 102. In these figures also, the hatching lines representing the sections are omitted for the sake of simplicity.

The essential difference between the removing the transferring process of the mold main body 105 from the above-mentioned transferring and installing process resides in that the plate 120 is provided with the unlocking blocks 172 (FIG. 10) for disengaging the mold main body 105 from the container 160. Thus, the following explanation is focused on the essential difference to avoid superfluous description.

In the step (a) shown to FIG. 12(a), the height of the conveyor 112 is adjusted by the height adjusting means 106 (FIG. 1) and the conveyor is moved to a position immediately in front of the vulcanizing machine 104 as being centered with respect to the lower holder 107. In the step (b) shown in FIG. 12(b), the conveyor 112 is moved forward after the mold main body 105 and the container 160 are moved upwards in the direction indicated by arrow U, and then brought into abutment with the lower holder 107 by the height adjusting means 106.

In the step (c) shown in FIG. 12(c), the plate 120 provided with the unlock blocks 172 is moved forwards until the pair of notches 135 are engaged with the pair of pins 140 to complete the positioning. Thus, in the step (d) shown in FIG. 12(d), the mold main body 105 and the container 160 are moved downwards in the direction indicated by arrow D, and thereby mounted on the plate 120. On this occasion, the plate members 166 of all of the latch means 165 are caused by the unlock blocks 172 to move upwards, thereby releasing the locking engagement between the lock arms 167 and the lock pins 154. At the same time, the locking engagement between the upper holder 163 and the top plate 169 is released.

In the step (e) shown in FIG. 12(e), the unlocked state of the lock arms 167 and the lock pins 154 is maintained, while the container 160 is moved upwards in the direction indicated by arrow U, together with the container ring 162. By such movement, the segments 161 are moved radially outwards to automatically release the mold main body 105. In the step (f) shown in FIG. 12(f), the segments 161 and the container ring 162 are moved upwards while leaving the mold main body 105 on the lower holder 107.

Figure 12G:
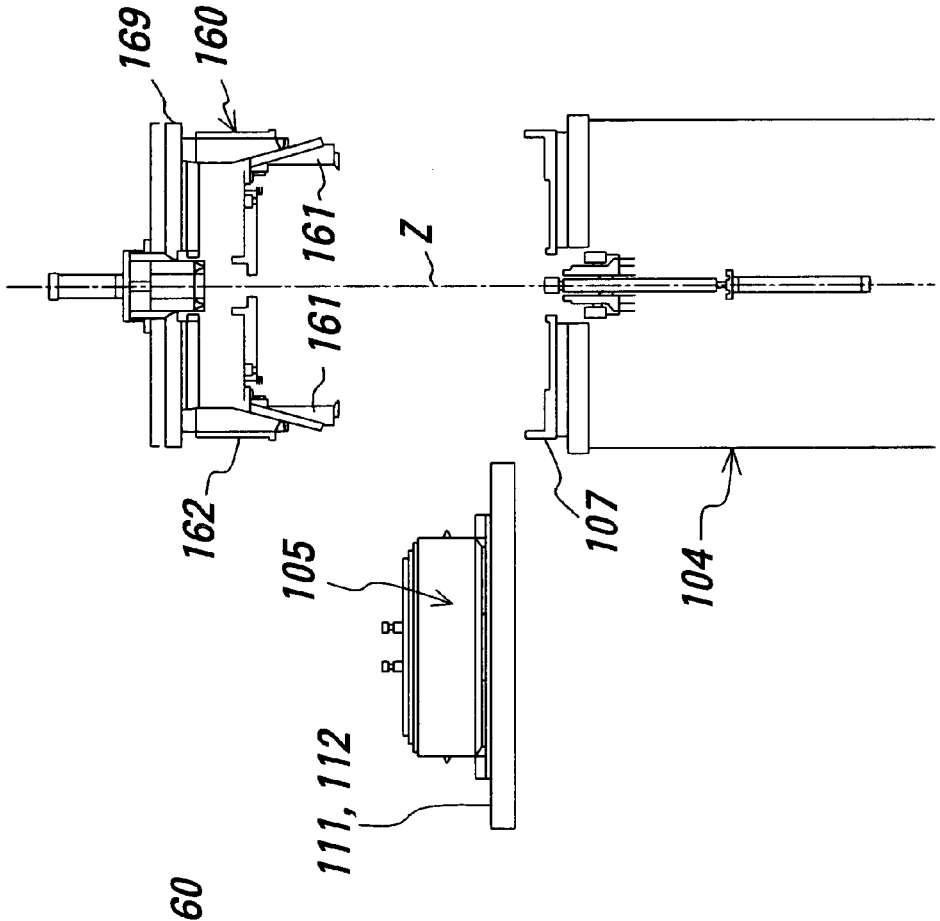
Figure 12H:
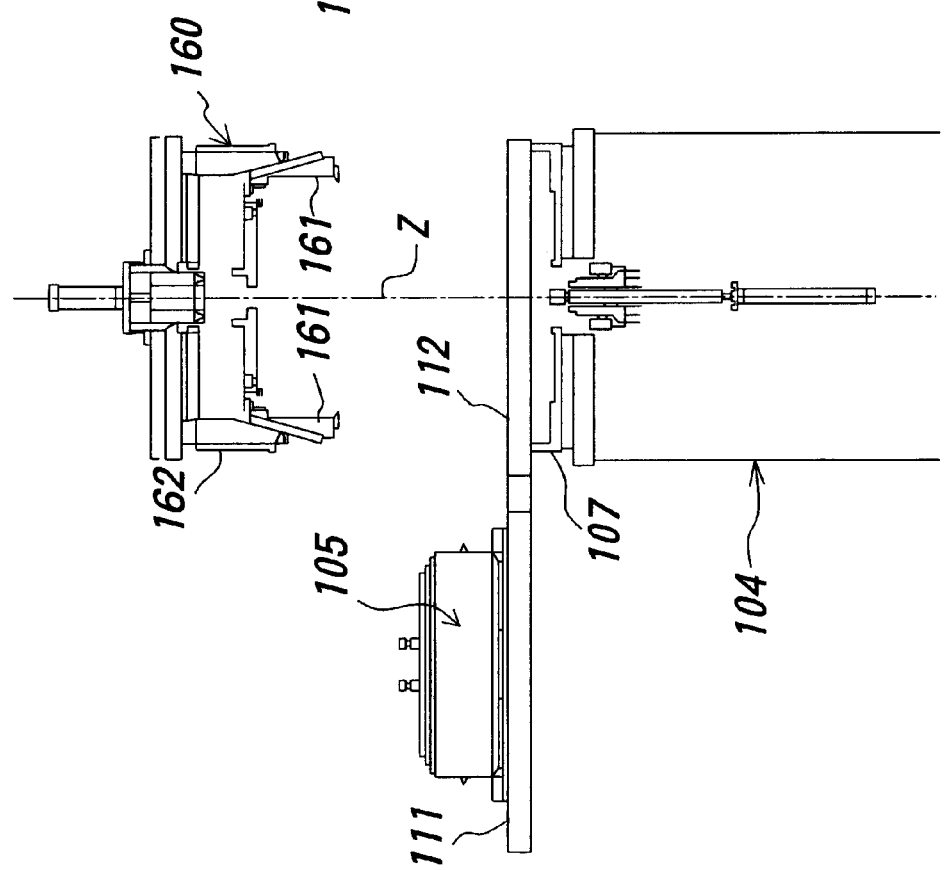

In the step (g) shown in FIG. 12(g), the plate 120 as in the step (f) is moved rearwards to remove the mold main body 105 onto the transfer device 102. Then, in the step (h) shown in FIG. 12(h), the conveyor 112 is moved by the height adjusting means 106 slightly upwards and further moved rearwards onto the transfer device 102 to complete removal and transfer of the mold main body 105.

As explained above, as compared to the difficulty for removing the mold main body encountered in the prior art, the mold exchanger system according to the present invention makes it possible to remove the mold main body 105 from the lower portion of the vulcanizing machine 104 and transfer it onto the transfer device 102 in a smooth and facilitated manner and within a short time.

The above mentioned method for transferring and installing a mold main body 105 can be applied both to the starting-up of operation of the vulcanizing machine 104 in which the mold main body 105 is not yet installed, and also to the exchanging operation wherein a previously used mold main body 105 installed on the vulcanizing machine 104 is replaced by a new mold main body to be used subsequently. For such exchanging operation, the removing and transferring process for the mold main body 105 and the transferring and installing process for the mold main body 105 are performed alternately.

To this end, it is possible to apply the present invention to a mold exchanger system provided with a pair of transfer devices 102. In this instance, it is preferred for the plate 120 of one of the transfer devices 102 to be provided with blocks 171 for ensuring a stable mounting of the mould main body 105, with the plate 120 of the other transfer device 102 provided with unlock blocks 172.

Structure of Second Embodiment

A second embodiment of the present invention will be explained below with reference to FIGS. 13 to 17.

Figure 13:
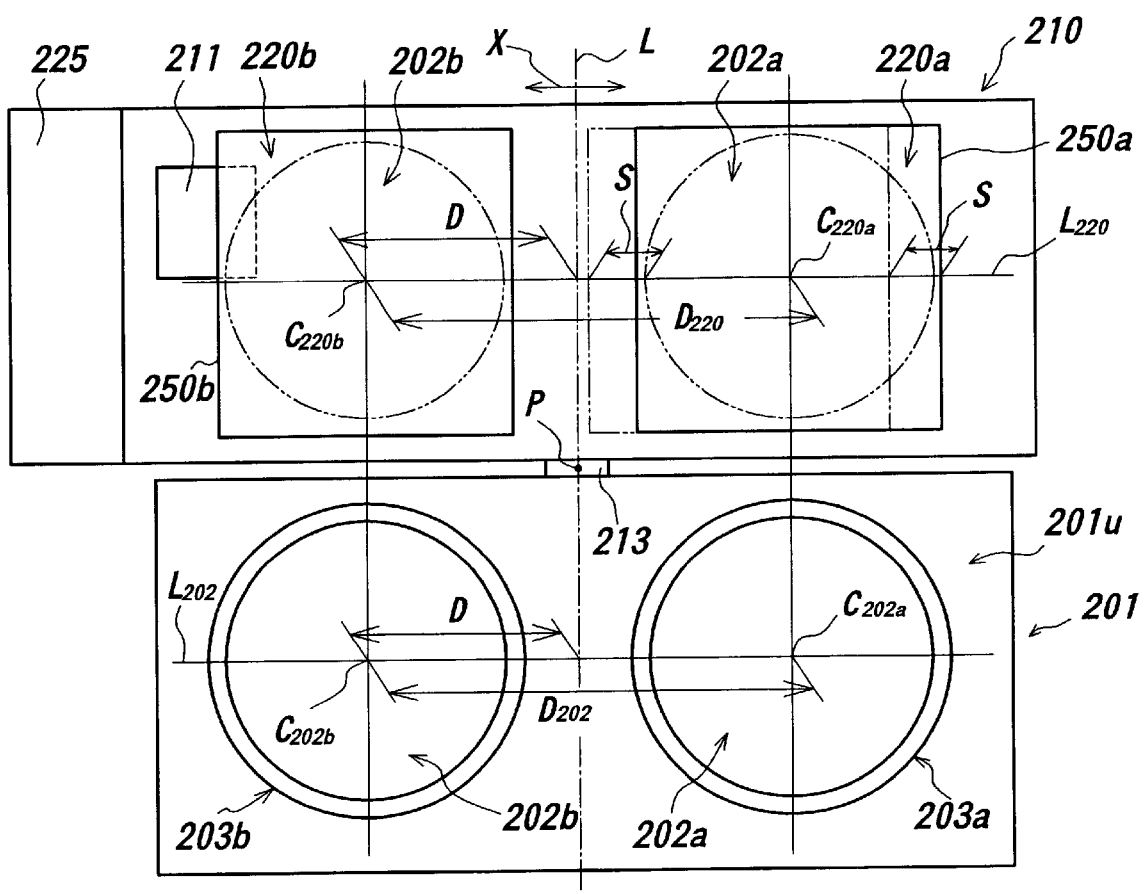
FIG. 13 is a schematic top plan view showing the mold exchanger system according to the second embodiment of the present invention, together with the lower part of the vulcanizing machine.

As shown in FIG. 13, the mold exchanger system according to the present invention is applied to a plurality of, or a number of vulcanizing machines that are installed side-by-side. The vulcanizing machines 201 are each in the form of a twin-mold type tire vulcanizing machine having two molds 202a, 202b that are arranged side-by-side as seen from the front. However, although the illustration is omitted, the molds 202a, 202b may be transferred with respect to two single-mold type tire vulcanizing machines that are arranged side-by-side. In this instance, each mold 202a, 202b may be either a split-type mold or a segmented-type mold. In the case of the segmented-type mold, the lower portion 201u of the vulcanizing machine 201 is provided with lower holders 203a, 203b, of which only the outer profile is shown, for accommodating the molds 202a, 202b.

Figure 14:
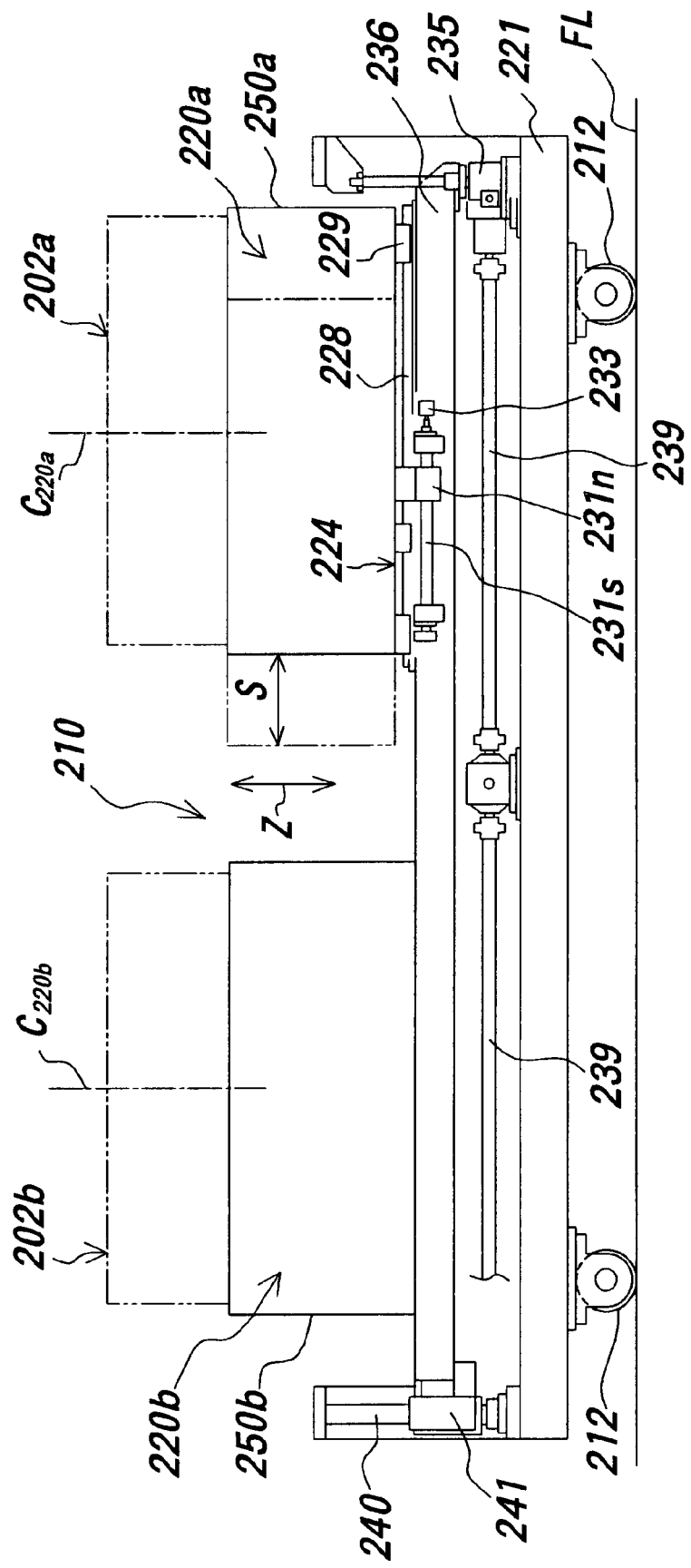
FIG. 14 is a front view showing the major part of the mold exchanger system.

As shown in FIGS. 13 and 14, the mold exchanger system 210 is comprised of a carriage 221 that is provided with a drive mechanism 211 and four wheels 212, and is thus movable in a self-advancing manner, in the direction indicated by double arrow X, while being guided by the track that is provided on the floor surface F. The mold exchanger system 210 is shown in FIG. 13 as being positioned relative to the vulcanizing machine 201 by means of the positioning means 213, and thereby assuming a stopped position in front of the predetermined vulcanizing machine 201 with respect to which the molds 202a, 202b shown by imaginary lines are to be transferred.

The carriage 210 is comprised of a pair of transfer means 220a, 220b and a common carriage 221 for supporting both of them. In the state of the mold exchanger system as shown in FIG. 13, the pair of transfer means 220a, 220b are arranged opposite to each other and in a side-by-side relation, as seen toward the vulcanizing machine 201. With such an opposed arrangement, the straight line L202 passing the center axes C202a, C202b of the molds 202a, 202b in the vulcanizing machine 201 is in parallel to the straight line L220 passing the center axes C220a, C220b of the molds 202a, 202b which are centered on the transfer means 220a, 220b. It is assumed that the molds 202a, 202b in the transfer means 220 are mounted substantially in the same plane.

The mold exchanger system is further comprised of a distance adjusting mechanism, the details of which will be explained hereinafter, for adjusting the distance between the transfer means 220a, 220b relative to each other, along the straight line L220. By operating the distance adjusting mechanism, as shown in FIGS. 13 and 14 by way of example, one of the transfer means 220a is movable in the direction of the straight line L220 between the position shown by solid line and another position shown by imaginary line. On the other hand, the other transfer means 220b is maintained fixed in the direction of the straight line L220. Alternatively, however, the transfer means 220a, 220b may be provided with respective distance adjusting mechanisms. An example of means for fixing the transfer means 220b will be primarily explained below.

It is conventional that, among a number of vulcanizing machines 201 relative to each other, the distance between two molds 202a, 202b, i.e., the distance D2 between the center axes C202a, C202b is not always constant and generally has a deviation. Thus, the distance adjusting means is made to have an adjusting stroke S which corresponds at least to the distance between two molds 202a, 202b of a number of vulcanizing machines 201 to which a single mold exchanger system is assigned in order to perform the required exchange. By this, the distance D220 between the center axes C220a, C220b of the molds 202a, 202b on the pair of transfer means 220a, 220b is always equal to the distance D202 between the center axes 202a, 202b of the two opposite molds 202a, 202b on the vulcanizing machine 201.

As for the positioning means 213, for example, one of the molds 202a in the vulcanizing machine 201 is treated as the mold of which the distance is to be adjusted, and the other mold 202b is used as a reference mold. In this instance, the mold exchanger system may be designed so that one of the transfer means 220a is provided with the distance adjusting means while the other transfer means is maintained fixed in the direction of the straight line L220.

By this, with respect to all of the assigned vulcanizing machines 201, the mold exchanger system 210 can perform exchange of two molds precisely and simultaneously, by reciprocatingly moving the transfer means 220a, 220b into, and out of the relevant vulcanizing machine 201. Here, it is assumed that the reciprocating direction of the transfer means 220a, 220b is perpendicular to the straight line L220.

Figure 15:
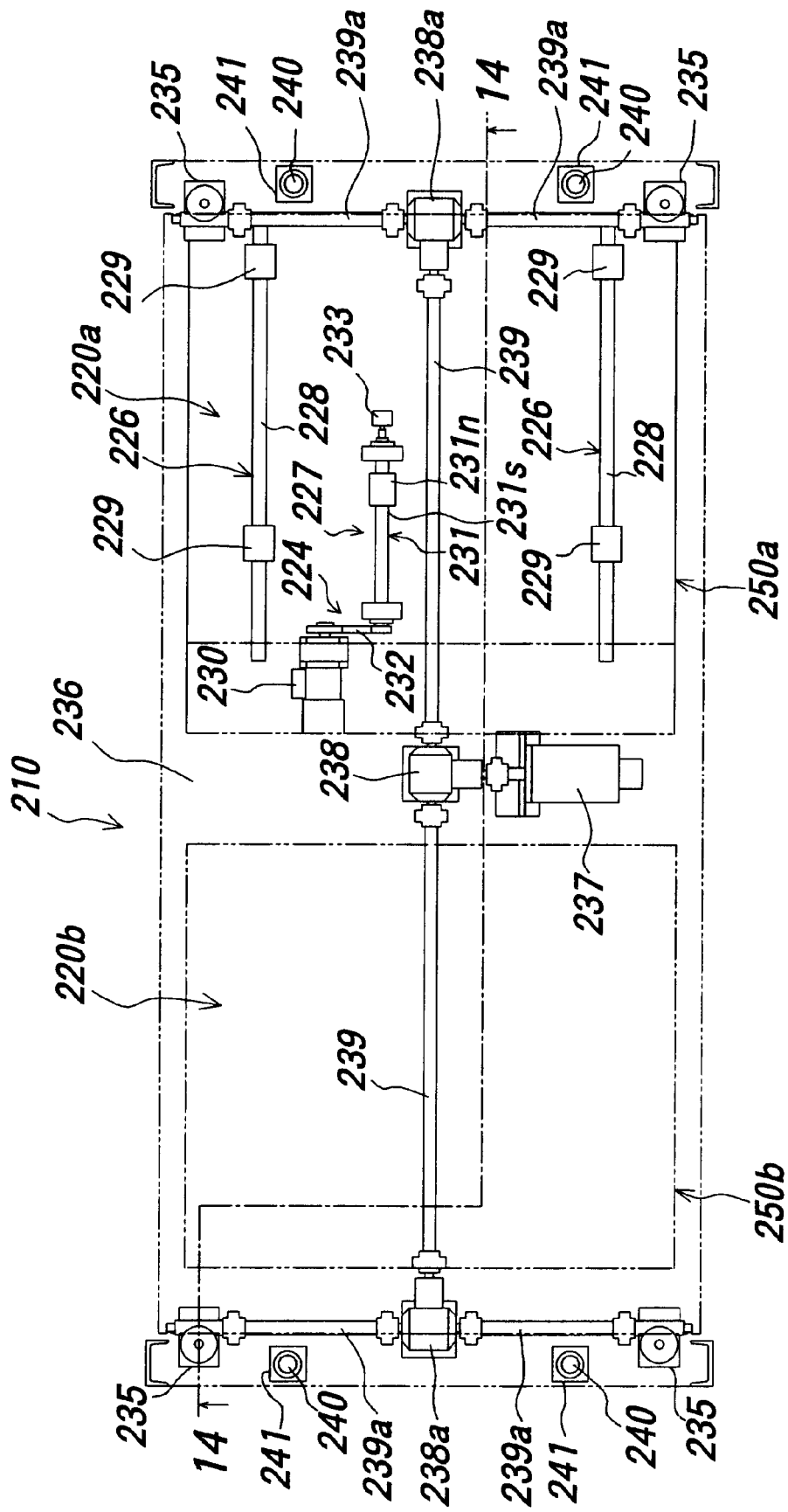
FIG. 15 is a top plan view showing the driving mechanism and the elevating mechanism in the mold exchanger system.

FIG. 15 illustrates the lower portions of the transfer means 220a, 220b as represented by imaginary lines. As shown in FIGS. 13 to 15, the distance adjusting mechanism is comprised of a moving means 224 for moving one of the transfer means 220a in a direction parallel to the straight line L220, and a controller 225 for the moving means 224. The moving means 224, in turn, is comprised of a guide means 226 for guiding the reciprocating movement of the transfer means 220a, and a drive means 227 for causing the movement of the moving means as it is guided by the guide means 226.

It is preferred that the guide means 226 is comprised of two sliding guide mechanisms or rolling guide mechanisms suitable for achieving a linear motion in parallel with the straight line L220 on both sides thereof. These guide mechanisms are comprised of two guide rails 228 extending parallel to the straight line L220, and a pair of block members 229 maintained in a sliding engagement or rolling engagement with the relevant rail 228. The upper end of each block member 229 is fixedly secured to the bottom portion of the transfer means 220a. The block members 229 of the pair of rolling guide mechanisms may be suitably comprised of "LM guide" produced by THK Co., Ltd., Japan. In any case, provided that a smooth and highly precise linear motion is ensured, the guide means may be comprised of any type of guide members.

The drive means is comprised of a motor 230, a ball screw mechanism 213, a timing belt 232 for transmitting the output torque of the motor 230 to the male screw of the ball screw mechanism 230, and a rotary encoder 233 arranged at the end portion of the ball screw mechanism 231. The controller 225 is supplied with the output signal of the rotary encoder 233 to control the rotational speed of the motor 230. By this, the drive means 227 assures a highly precise movement of the transfer means 220a.

The controller 225 is previously inputted with, and stores information unique to each machine type numbers. The unique information include the distance D202 between the center axes C202a, C202b of the two molds 202a, 202b, the information representing the reference position and its relation with the distance D202, the height of the molds 202a, 202b in the vulcanizing machine 201 from the floor surface F, and the like.

The transfer means 220a, 220b are arranged on a frame 236 connected to the upper ends of the two pairs of jacks 235 which, in turn, are fixedly secured to the four corners of the carriage 221. One of the transfer means 220a is secured to the frame 236 through the guide means 236 and the drive means 227, which are secured to the bottom plate of the frame 236. Practically, the transfer means 220a is secured in place through two pairs of the block members 229 and nuts 231, among the elements that are included in the guide means 236 and the drive means 227. The other transfer means 220b is directly secured to the frame 236. For the sake of convenience, the transfer means 220a, 220b and the frame 236 are shown in FIG. 15 by imaginary lines.

The pair of transfer means 220a, 220b include height adjusting means for adjusting the bottom height of the molds 202a, 202b to be mounted thereon, as measured from the floor surface FL by way of example. The height adjusting means is comprised of a single motor 237 operative under the control of the controller 225, and two pairs of jacks 235 that can be driven by the motor 237 and thereby moved upwards and downwards. The output torque of the motor 237 is transmitted to each of the jacks 235 through a gear box 238 and a pair of gear boxes 238a, and a pair of opposite drive shaft 239 and two pairs of opposite drive shafts 239a.

The frame 236 is comprised of slide members 241 that are in sliding engagement with guide members 240 extending vertically upwards from those positions of the carriage 221 adjacent to the four corners thereof, wherein the slide members 241 each have a lower surface that is connected to the upper end of the elevating portion of the relevant jack 235. Such an arrangement ensures that the pair of transfer means 220a, 220b can be smoothly and precisely moved vertically upwards and downwards in the direction indicated by double arrow Z (FIG. 14).

Figure 16:
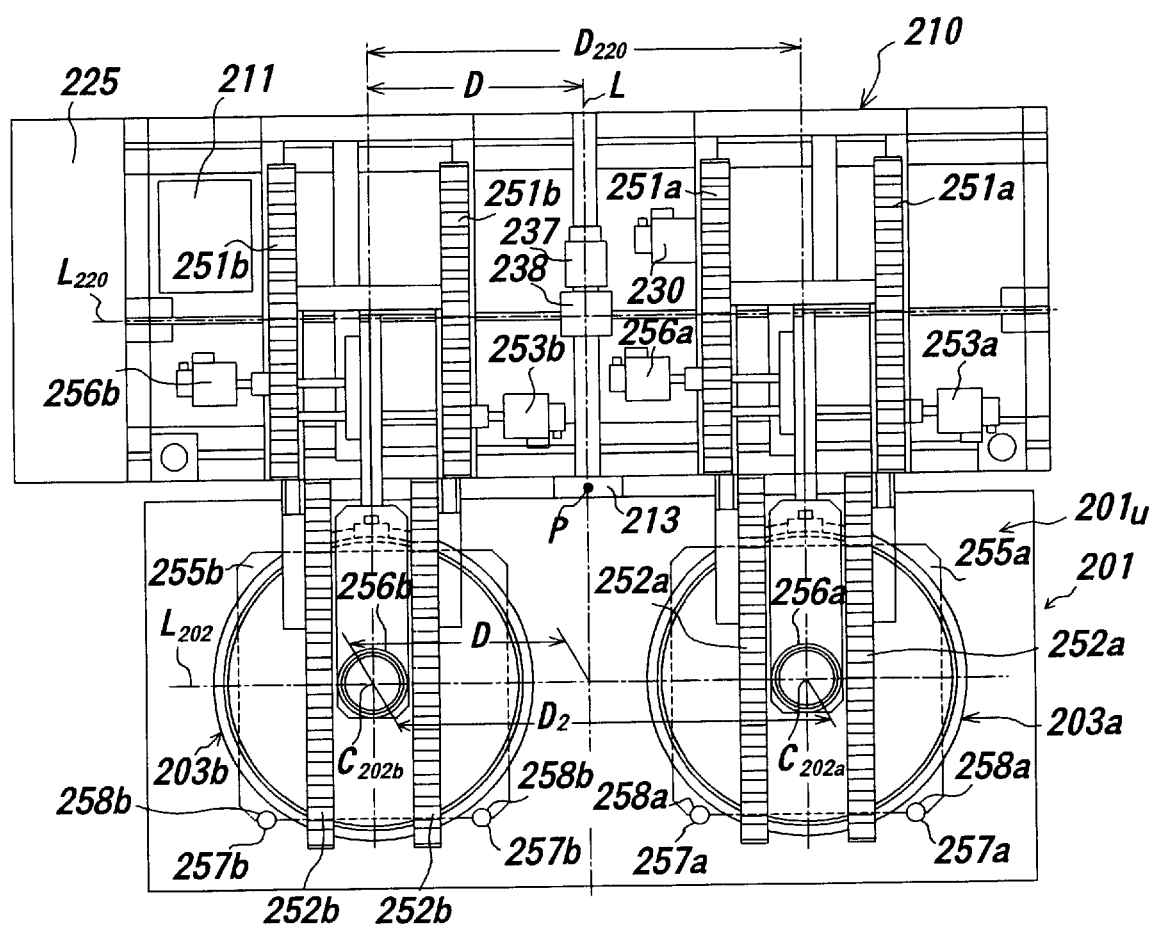
FIG. 16 is a top plan view showing the major part of the mold exchanger system together with the lower part of the vulcanizing machine.
Figure 17:
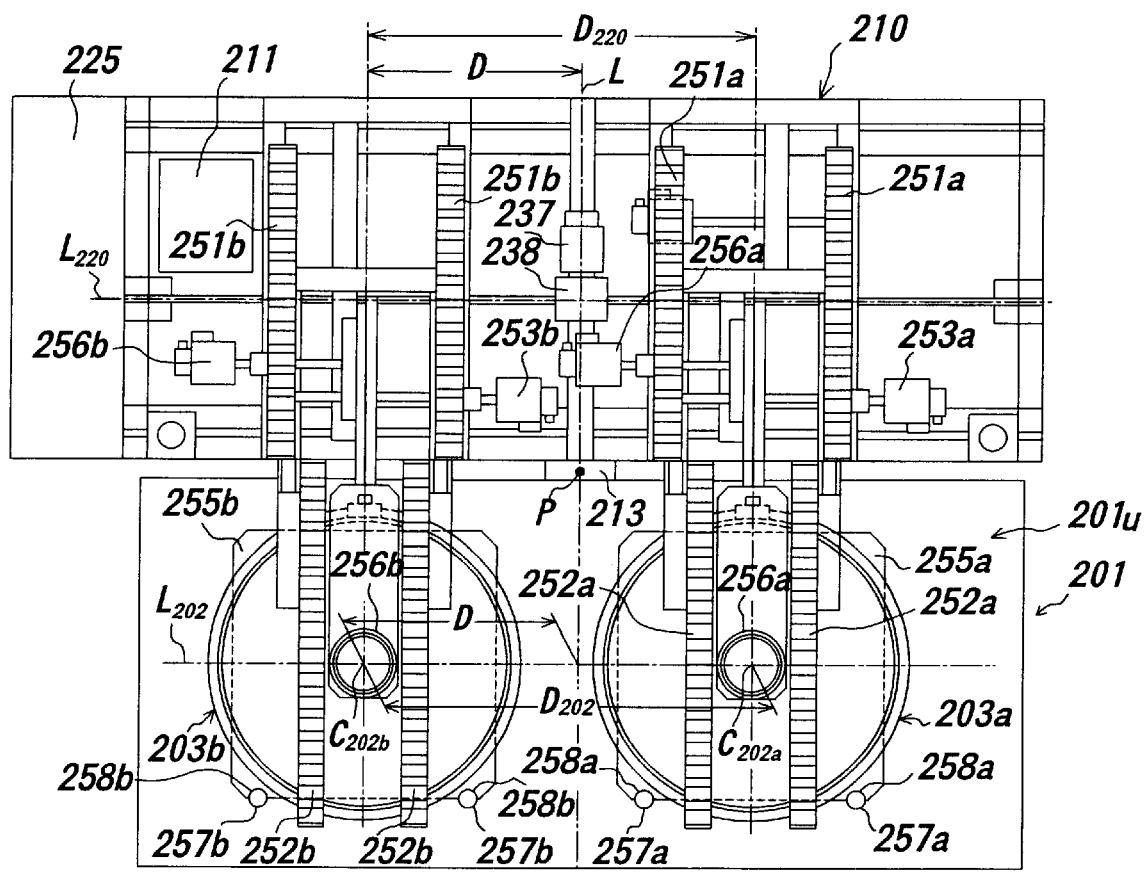
FIG. 17 is a top plan view showing the major part of the mold exchanger system together with the lower part of another vulcanizing machine.

FIGS. 16 and 17 show the mode of transferring the molds 202a, 202b onto the lower portions 201u of the vulcanizing machine 201, and the state immediately before removal of the molds 202a, 202b from the vulcanizing machine 201 onto the transfer means 220a, 220b, respectively. In these figures, the representation of the molds 202a, 202b is omitted for the sake of clarity.

The transfer means each are comprised of a pair of first conveyors 251a, 251b and a pair of second conveyors 252a, 252b, that are arranged in the upper portion of the main body 250a, 250b. In the figures, the second conveyors 252a, 252b are shown as being arranged on the inner side of the first conveyors 251a, 251b of the pair, though a reversed arrangement may be applied as well. Also, there may be arranged only a single conveyor on the inner side.

The first conveyors 251a, 251b are fixed in the direction Y as indicated by double arrow, that is perpendicular to the straight line L220, whereas the second conveyors 252a, 252b are reciprocatingly movable in the double arrow direction Y. More particularly, the second conveyors 252a, 252b are reciprocatingly movable back and forth between the position (not shown) adjacent to the first conveyors 251a, 251b, and the position on the upper side of the lower portions 201u of the vulcanizing machine 201. Such reciprocating movement of the second conveyors is caused by the driving force of the motors 253a, 253b.

The transfer means 220a, 220b each are further comprised of a plate 225a, 255b (shown by imaginary line) that can be mounted on the first conveyors 251a, 251b and the second conveyors 252a, 252b and reciprocatingly moved. The plate 255a, 255b is designed so as to be reciprocatingly movable between a position where the first conveyors 251a, 251b and the second conveyors 252a, 252b are adjacent to each other, and a position above the second conveyors 252a, 252b in their advanced positions. Such reciprocating movement of the plate is caused by the driving force of the motors 265a, 265b.

The molds 202a, 202b are mounted and centered on the plates 255a, 255b, respectively. The plates 202a, 202b are comprised of registers 256a, 256b which can be fitted with the inner peripheral surfaces of the molds 202a, 202b, respectively, for achieving the centering relative to each other. The registers 256a, 256b have center axes which coincide with the center axes C220a, C220b of the transfer means 220a, 220b, respectively. The registers 256a, 256b form part of the mold positioning means for positioning the molds 220a, 220b within the vulcanizing machine 201 relative to the predetermined positions.

The mold positioning means are further comprised of positioning members 257a, 257b provided for the lower portion 201u of the vulcanizing machine 201, and notches 258a, 258b provided for the plates 255a, 255b so as to be fittingly engageable with the positioning members. The notches 258a, 258b are arranged on the edges of the plates 255a, 255b on the side of the vulcanizing machine 201. In order to achieve a precise positioning function, it is preferred that the positioning members 257a, 257b and the notches 258a, 258b are arranged to form respective pairs.

Operation of Second Embodiment

The mold exchanger system 201 of the second embodiment explained above with reference to FIGS. 13 to 17 can be suitably applied to the production of tires by means of the production lines wherein a number of vulcanizing molds 201 are arranged, the current problem of which involves:

(1) the deviation of the relative distance D202 between the two molds 202a, 202b;
(2) the difference in installation heights of the molds 202a, 202b at the lower portion 201u of the vulcanizing machine 201; and
(3) the difference in height between the lower holders 203a, 203b; in such a manner as to allow a simultaneous exchange of the two molds 202a, 202b within a very short time and under a highly precise positioning. Also, by using the first conveyors 251a, 251b and the second conveyors 252a, 252b, the molds 202a, 202b can be smoothly moved between the mold exchanger system 210 and the lower portion 201u of the vulcanizing machine 201. These advantages are particularly significant when, in particular, the molds 202a, 202b are segmented-type molds.

The manner of exchanging the molds 202a, 202b by means of the mold exchanger system 210 will be more fully described below.

The mold exchanger system 210 which is being moved is positioned by the positioning means 213 relative to the vulcanizing machine 201 with respect to which the molds 202a, 202b are to be transferred, so that they are properly opposed to each other. In this instance, it is assumed that the controller 225 has been previously inputted with the installation distance date of the neighboring molds 202a, 202b in the vulcanizing machine. Also inputted to the controller 225 are the height, as measured from the floor surface FL, with which the lower portion 201u of each vulcanizing machine 201 can be passed, i.e., the height allowing the passage of the lower holders 203a, 203b, as well as the installation height data of the molds 202a, 202b with reference to the floor surface FL, i.e., the height data of the mold bottom surface.

Subsequently, the moving means 224 of the distance adjusting means is operated so that the distance between the pair of transfer means 220a, 220b is made equal to the installation distance between the molds 202a, 202b in the vulcanizing machine 201. This operation is automatically performed during the period in which the proper opposed relationship is achieved, based on the output signal of the controller 225. The relevant distances in this instance are the distance D202 between the center axes C202a, C202b of the molds 202a, 202b in the vulcanizing machine 210, and the distance D220 between the center axes C220a, C220b of the transfer means 220a, 220b. During such adjustment, relative to the reference point P of the positioning means 213, the distance D220 is made equal to the distance D202.

More specifically, as seen in plan view, a straight line passing the reference point P and expending perpendicular to the straight line L202 is used as the reference line L, and the distance D between the center axis C202b of the mold 202b and the reference line L is commonly applied to all of the vulcanizing machines 201 which are assigned to a predetermined mold exchanger system 210. In other words, the distance D between the center axis C220b of the transfer means 220b and the reference line L is fixed.

Subsequently, the vulcanizing machine 210, of which a half of the maximum distance D202 equals the distance D, is used as the reference vulcanizing machine, and the position of the center axis C220a corresponding to the center axis C202a of the mold 202a in the reference vulcanizing machine 210 is used as the starting point of the distance adjustment for the transfer means 220a relative to the transfer means 220b. The transfer means 220a at such starting point is shown in FIG. 1 by a solid line.

In the next place, with reference to the vulcanizing machine 210 having the minimum distance D202, the transfer means 220a is moved from the starting point to the end point which corresponds to the difference d (mm) of the distance D202 (mm) from the distance D (mm). This means that the distance adjustment is performed by a unidirectional movement of the transfer means 220a. The difference d (mm) in terms of the distance is the adjusting stroke S (mm) of the distance adjusting mechanism. The adjusting stroke S is the minimum stroke; from a practical viewpoint, the adjusting stroke S is determined such that the starting point is at a position having the distance which exceeds the distance D, and the end point is at a position having a distance which exceeds the differential distance d.

There is shown in FIG. 4 a mold exchanger system 210 positioned relative to the reference vulcanizing machine 201, in which D202=1900 mm and D=950 mm. There is further shown in FIG. 5 a mold exchanger system 210 of which the transfer means 220a has been moved by the distance adjusting mechanism to a position corresponding to the differential distance d (mm), and in which D202=1670 mm, D=950 mm and d=230 mm.

Incidentally, when the differential distance d has a significantly large value, it is preferred that a distance adjusting means if provided for the transfer means 220b as well, similar to the one for the transfer means 220a. In this instance, the differential distance d is divided into distances d1 and d2, and both of the transfer means 220a, 220b are moved to adjust the distance therebetween.

For the adjustment of the distances D202, D220, the positioning means shown in FIGS. 1 and 4 plays an important role. In this respect, the positioning means 213 according to the present embodiment is different from the conventional means simply for positioning the mold exchanger system 210 with reference to the vulcanizing machine 201.

When the conveyors 252a, 252b of the transfer means 220a, 220b are situated at inadequate height positions relative to the lower holders 203a, 203b at the lower portion 201u of the vulcanizing machine 201, the height adjusting means is operated synchronously with the operation of the moving means 224 of the distance adjusting mechanism. Here, the words "inadequate height" refer to the case in which the height of the conveyors 252a, 252b relative to the lower holders 203a, 203b is either excessive or insufficient. In any case, the conveyors 252a, 252b have to be maintained at a height position where the lower holders 203a, 203b can be passed.

During the period in which a properly opposed relationship is achieved between the vulcanizing machine 201 and the mold exchanger system 210, the height adjusting means is automatically operated as well, based on the output signal of the controller 225. However, the height adjusting means is not operated when the height of the molds 202a, 202b is the same before and after the exchange of the molds. When the height adjustment is required, the height adjusting means is operated such that, in the first stage, the conveyors 252a, 252b are maintained at a height position that allows the passage of the lower holders 203a, 203b and, in the second stage, the conveyors 252a, 252b are lowered and thereby brought into abutment with the lower holders 203a, 203b. The height adjustment in these stages is performed automatically.

Subsequently, the motors 256a, 256b are operated to advance the plates 255a, 255b toward the vulcanizing machine 201, and the movement of the plates 255a, 255b is stopped when the notches 258a, 258b are brought into abutment with the positioning members 257a, 257b. In FIGS. 4 and 5, the plates 255a, 255b after the advancing movement has been stopped are shown by imaginary lines. The process steps described above are common to the transfer of the molds 202a, 202b to the vulcanizing machine 201, and the removal of the molds 202a, 202b from the vulcanizing machine 201. The successive process steps will be individually described below.

When the molds 202a, 202b are to be transferred to the vulcanizing machine 201, the plates 255a, 255b mounting these molds thereon are advanced and positioned within the vulcanizing machine 201. The molds 202a, 202b positioned on the plates 255a, 255b are sufficiently supported by the lower portion 201u of the vulcanizing machine 201, i.e., the lower holders 203a, 203b, and also by the conveyors 252a, 252b.

These molds 202a, 202b are temporarily lifted upwards by a lifting device (not shown) above the vulcanizing machine 201, e.g., by the container of the segmented-type mold. It is of course that the lifting device is centered with reference to the molds 202a, 202b. In this state, the conveyors 252a, 252b which have been slightly lifted are moved rearwards onto the transfer means 220a, 220b together with the plates 255a, 255b. Then, the lifting device is lowered so that the molds 202a, 202b are mounted onto the lower holders 203a, 203b of the vulcanizing machine 201.

When the molds 202a, 202b are to be removed from the vulcanizing machine 201, these molds are lifted by the same lifting device above the vulcanizing machine 201 and the conveyors 252a, 252b are moved forwards and brought into abutment with the lower holders 203a, 203b. Subsequently, or simultaneously, the plates 255a, 255b are moved forward to the positioning positions, and the molds 202a, 202b are moved downwards and mounted onto the plates 255a, 255b while being separated from the lifting device. Then, the plates 255a, 255b mounting the molds 202a, 202b are moved rearwards onto the transfer means and the conveyors 252a, 252b are also moved rearwards.

The above mentioned transfer methods of the molds to the vulcanizing machine and the removing method of the molds from the vulcanizing machine are applied when the previously used molds 202a, 202b are to be changed with the newly used molds 202a, 202b. In this instance, two mold exchanger systems 210 are arranged in series with each other. Also, the mold transfer method can be applied when the molds 202a, 202b are to be transferred to, and installed in the vulcanizing machine which is in a non-operating condition. By inputting information relating to the vulcanizing machines, it is possible to perform the mold exchange either fully automatically or semi-automatically.

By using the mold exchanger system 210 according to the above-mentioned second embodiment, and applying the above-mentioned method, two molds 202a, 202b can be simultaneously exchanged with respect to the vulcanizing machine highly efficiently and precisely, notwithstanding the difference in specification of the vulcanizing machines 201 or the difference in installation modes.

Structure of Third Embodiment

The mold exchanger system according to the third embodiment of the present invention will be described below.

Figure 18:
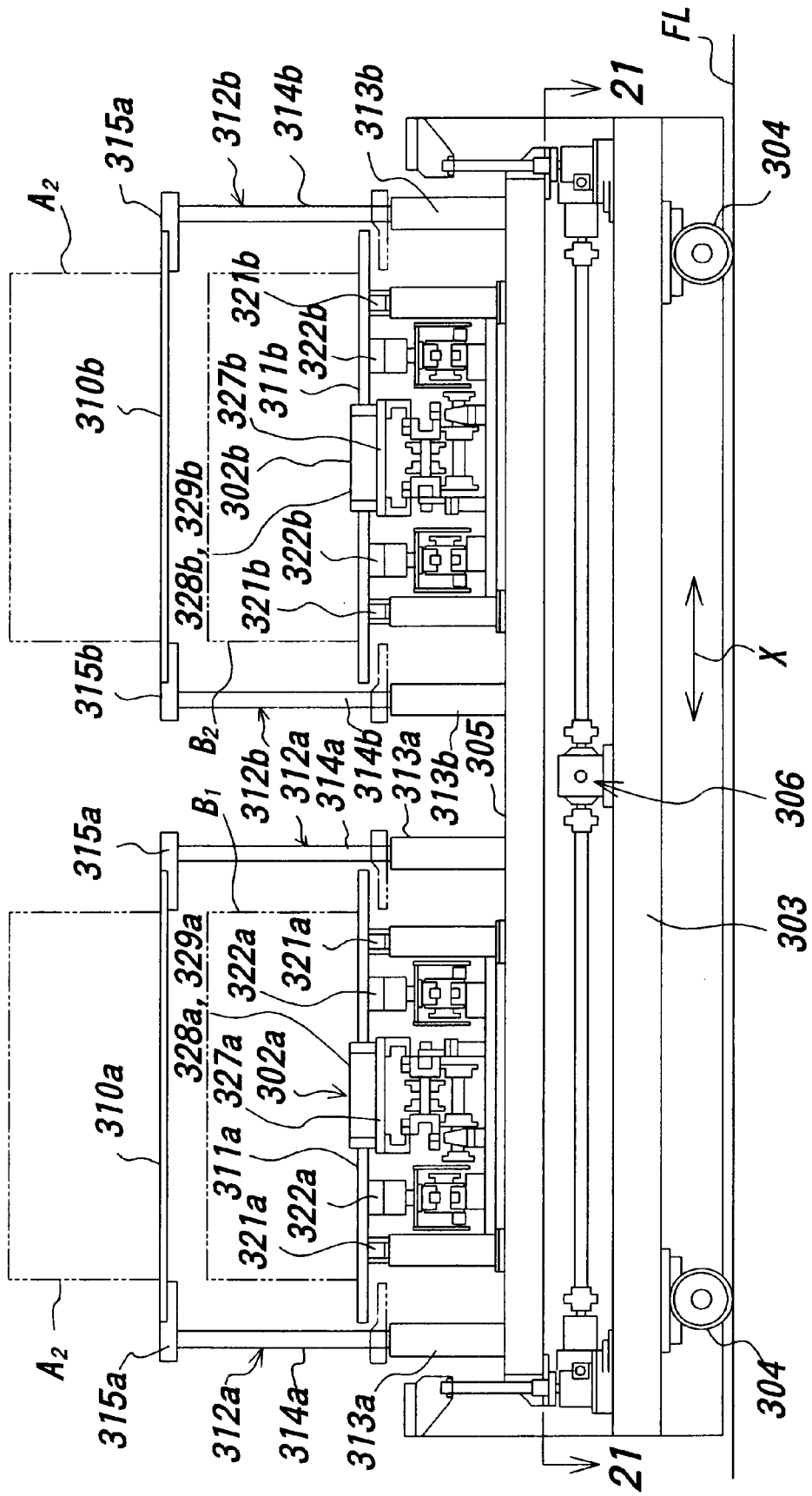
FIG. 18 is a rear view of the mold exchanger system according to the third embodiment of the present invention.
Figure 19:
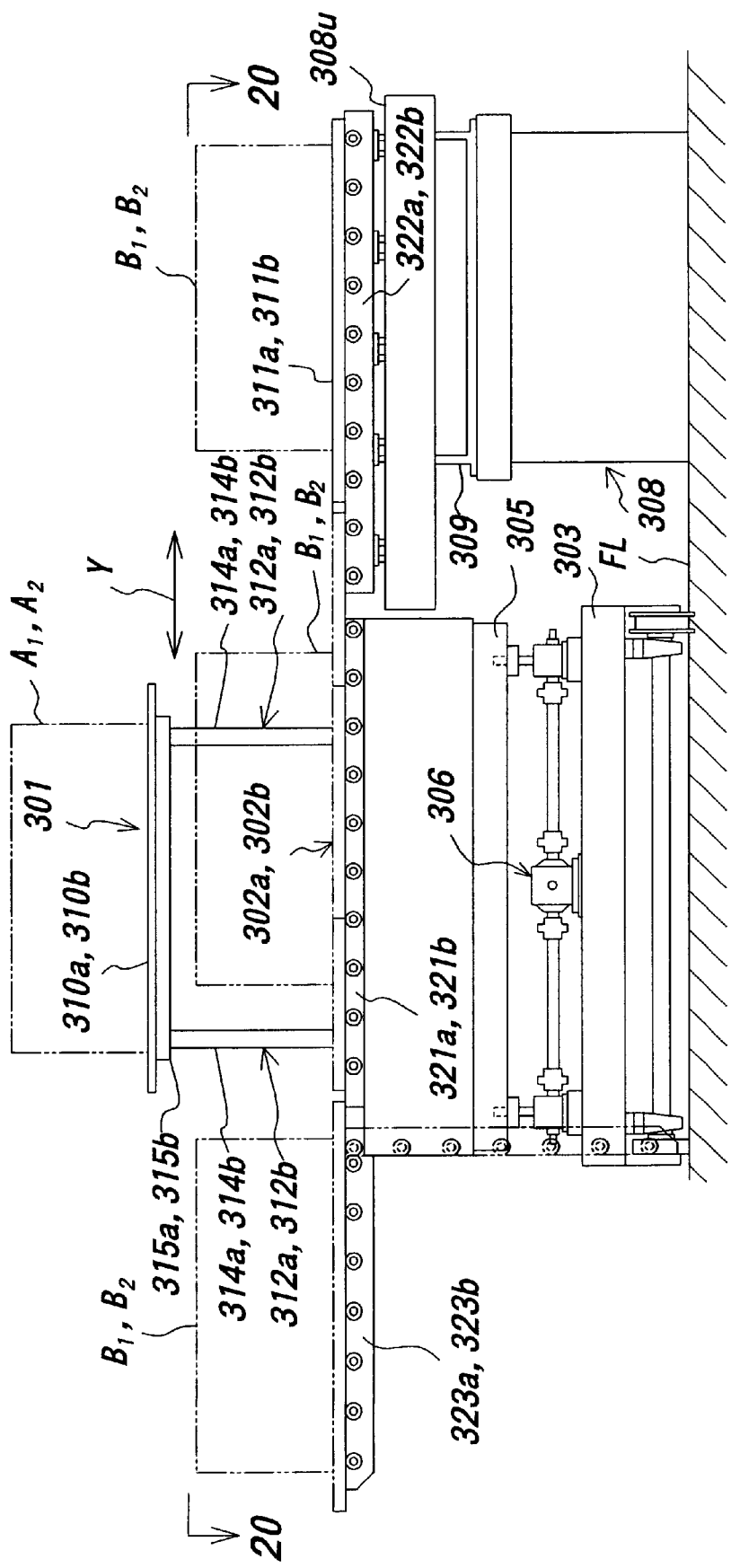
FIG. 19 is a side view showing the major part of the mold exchanger system together with the lower part of the vulcanizing machine.
Figure 20:
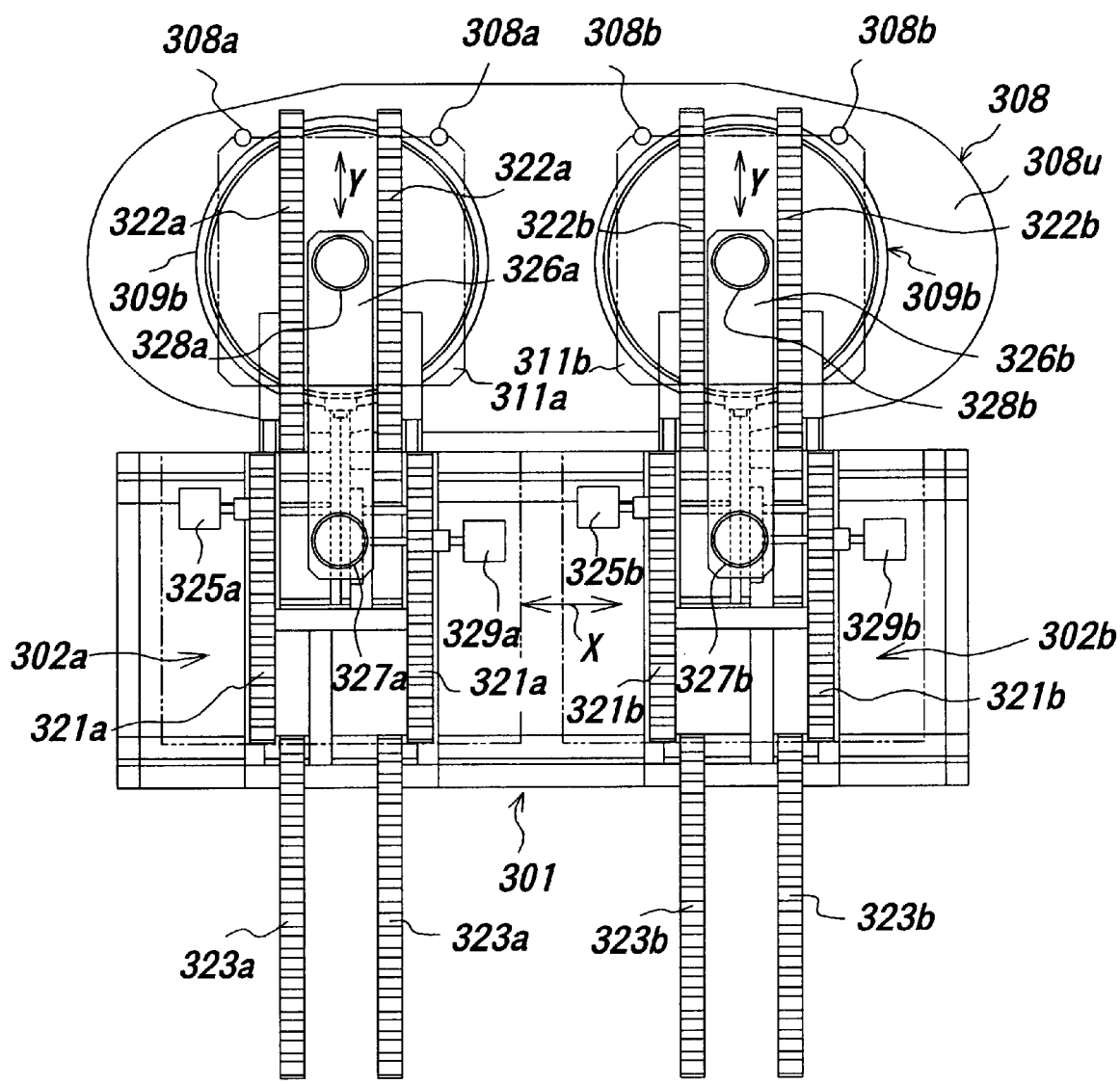
FIG. 20 is a schematic side view showing the mold exchanger system together with the vulcanizing machine.

As shown in FIGS. 18 to 20, the mold exchanger system 301 is comprised of transfer means 302a, 302b and a carriage 303 carrying these transfer means 302a, 302b. A single transfer means may be provided, though the following description will be made of a mold exchanger system 301 comprised of a pair of transfer means 302a, 302b capable of providing an improved exchange efficiency.

The carriage 303 is provided with four wheels 304 and is movable along a track that is arranged at a predetermined location, in a self-advancing manner. To this end, at least two wheels 304 can be driven for rotation by a motor, not shown. The pair of transfer means 302a, 302b are secured on a support 305 in alignment with the moving direction of the mold exchanger system 301, that is indicated by double arrow X. The support 305 is connected to the carriage 303 through a height adjusting means 306, the details of which will be explained hereinafter.

The lower portion 308 of the vulcanizing machine is shown in FIGS. 19 and 20. The lower portion 308 of the vulcanizing machine has an upper surface 308u provided with a pair of pins 308a, 308b for the positioning of the mount portion to be explained hereinafter. In the present embodiment, the molds is in the form of a segmented-type mold, and the lower holder 309 for the segmented-type mold is attached to the upper surface 308u at the lower portion 308 of the vulcanizing machine.

The transfer means 302a is provided with a pair of mount portions 310a, 311a for mounting two molds A1, B1 as indicated by imaginary lines, in alignment with the same transfer direction. Similarly, the transfer means 302b is provided with a pair of mount portions 310b, 311b for mounting two molds A2, B2 as indicated by imaginary lines, in alignment with the same transfer direction.

The molds transfer direction in the present embodiment is indicated in FIG. 19 by double arrow Y. As seen in the plan view, the arrow Y extends on the straight line which passes the center axes of the molds A1, B1, A2, B2 on the transfer means 302a, 302b, and the mold installation center of the lower portion 308 or the lower holders 309 of the vulcanizing machine. In FIGS. 19 and 20, the molds A1, A2 are the newly used molds while the molds B1, B2 are the previously used molds.

The mount portions 310a, 311a, 310b, 311b are each comprised of a plate. For the sake of convenience, only the mount portions 311a, 311b are shown in FIG. 20 by imaginary lines. Each plate has a center portion provided with a centering register to be fitted with the inner peripheral surface of the mold A1, B1, A2, B2, or a hole corresponding to such register. Also, each mount portion 310a, 310b, 311a, 311b has a tip end with a recess that is engageable with the positioning pin 308a, 308b at the lower portion 308 of the vulcanizing machine.

The transfer means are each comprised of elevating means 312a, 312b for moving one of the mount portions 310a, 310b upwards or downwards. Each transfer means 302a, 302b is provided with a pair of such elevating means 312a, 312b, as seen in the direction indicated by arrow X. The elevating means is designed so as to be engageable with one of the mount portions 310a, 310b when moved upwards, and disengaged from the mount portions 310a, 310b when the downward movement has been completed.

As shown in FIGS. 18 and 19, the elevating means 312a, 312b each have an elevating stroke such that one of the mount portions 311a, 311b on which the mould B1, B2 is mounted can be passed below the other mount portion 310a, 310b which is situated at an elevated level.

The type of the elevating means is not particularly limited provided that the above condition is met. In the illustrated embodiment, the elevating means 312a, 312b are each comprised of an actuator in the form of a double-acting cylinder device 313a, 313b. These actuators 313a, 313b are provided in pair for one of the mount portions 310a, 310b on both sides of the direction indicated by arrow X, with the lower ends of the actuators 313a, 313b fixedly connected to the support 305.

With reference to FIG. 18, at the lowermost position of each elevating rod 314a, 314b indicated by imaginary line, the support members 315a, 315b are separated and unlocked from the one mount portion 310a, 310b. In such an unlocked position, one of the mount portions 310a, 310b assume the same positions as the other mount portions 311a, 311b. In such a state, as shown in FIG. 19, the mount portions 311a, 311b are situated on the front side opposite to the lower portion 308 of the vulcanizing machine or on the rear side remote from the lower portion 308 of the vulcanizing machine. This will be more fully described hereinafter.

Also, the transfer means 302a, 302b are each provided with a moving mechanism for moving the pair of mount portions 310a, 310b and the lair of mount portion 311a, 311b one by one, into, and out of the lower portion 308 of the vulcanizing machine. Thus, the mount portions 310a, 310b forming a pair are simultaneously moved in and out, while the mount portions 311a, 311b forming another pair are simultaneously moved in and out at another point in time. The details of the moving mechanism will be described below.

The moving mechanism is comprised, in the upper portion of the transfer means 302a, 302b, of first conveyors 321a, 321b, second conveyors 322a, 322b and third conveyors 323a, 323b. The first conveyors 321a, 321b assume a fixed position relative to the support 305. The second conveyors 322a, 322b are reciprocatingly movable between a position in which they are adjacent to the first conveyors 321a, 321b, and the lower portion 308 of the vulcanizing machine. The third conveyors 323a, 323b are situated behind the first conveyors 321a, 321b.

The first, second and third conveyors shown in FIGS. 18 and 20 are each comprised of a pair of free roller conveyors which are relatively narrow as seen in the direction indicated by arrow X. The free roller conveyors forming each pair are arranged with a predetermined distance therebetween. The second conveyors 322a, 322b and the third conveyors 323a, 323b are arranged within the distance between the first conveyors 321a, 321b. This positional relationship may be reversed, if necessary. As shown in FIG. 18, the first conveyors 321a, 321b are attached to support members 324a, 324b which, in turn, are fixedly secured to the support 305. The second conveyors 322a, 322b are driven by motors 325a, 325b and thereby reciprocatingly movable in the transfer direction. Such reciprocating movement is performed by a sprocket-chain system that is arranged between the frame, to which the second conveyors 322a, 322b are attached, and the motors 325a, 325b.

The third conveyors 323a, 323b each have a rotational center at the upper rear side of the transfer means 302a, 302b, as shown in FIG. 19, so that they can be rotated between a lateral position indicated by imaginary line, to extend in the same direction as the first conveyors 321a, 321b and a longitudinal position indicated by solid line, on the rear side of the transfer means 302a, 302b. Such rotational movement is caused by an actuator (not shown) that is arranged between the support 305 and the third conveyors 323a, 323b.

The mount portions 310a, 310b forming one of the pairs are reciprocatingly movable in the transfer direction, between the first conveyors 321a, 321b and the second conveyors 322a, 322b that have been advanced toward the lower portion 308 of the vulcanizing machine. The mount portions 311a, 311b forming another pair are also reciprocatingly movable in the transfer direction, though between the second conveyors 322a, 322b that have been advanced toward the lower portion 308 of the vulcanizing machine and the third conveyors 323a, 323b at the lateral position, through the first conveyors 321a, 321b.

As shown in FIGS. 19 and 20, the transfer means 302a, 302b are provided with moving members 326a, 326b that are engageable with the pair of mount portions 310a, 310b and also with the other pair of mount portions 311a, 311b. Each moving member 326a, 326b has a shape as seen in the plan view, which exhibits a narrow width and a length that corresponds to the width, as seen in the transfer direction, of the mold exchanger system, and is arranged between the pair of second conveyors 322a, 322b and the pair of third conveyors 323a, 323b.

The moving members 326a, 326b are each provided, at two locations spaced in the longitudinal direction from each other, with a projection 327a, 327b for engaging the mount portion 310a, 310 of the pair, and another projection 328a, 328b for engaging the mount portion 311a, 311b of the other pair. These projections 327a, 327b, 328a, 328b are each fittingly engageable with the inner peripheral surface of the register at the mount portion 310a, 310b of the pair or at the mount portion 311a, 311b of the other pair, or with the hole that corresponds to the register. FIGS. 18 and 20 show an example wherein the projection is fittingly engaged with the hole. In this way, besides the engagement with the mount portion, the projections serve to precisely position and center the molds A1, A2, B1, B2.

The transfer means 302a, 302b are provided with motors 329a, 329b, respectively, as shown in FIG. 20. The moving members 326a, 326b are driven by the motors 329a, 329b and thereby moved reciprocatingly in the transfer direction. Such reciprocating movement is achieved by a sprocket-chain system that is arranged between the moving members 326a, 326b and the motors 329a, 329b.

Figure 21:
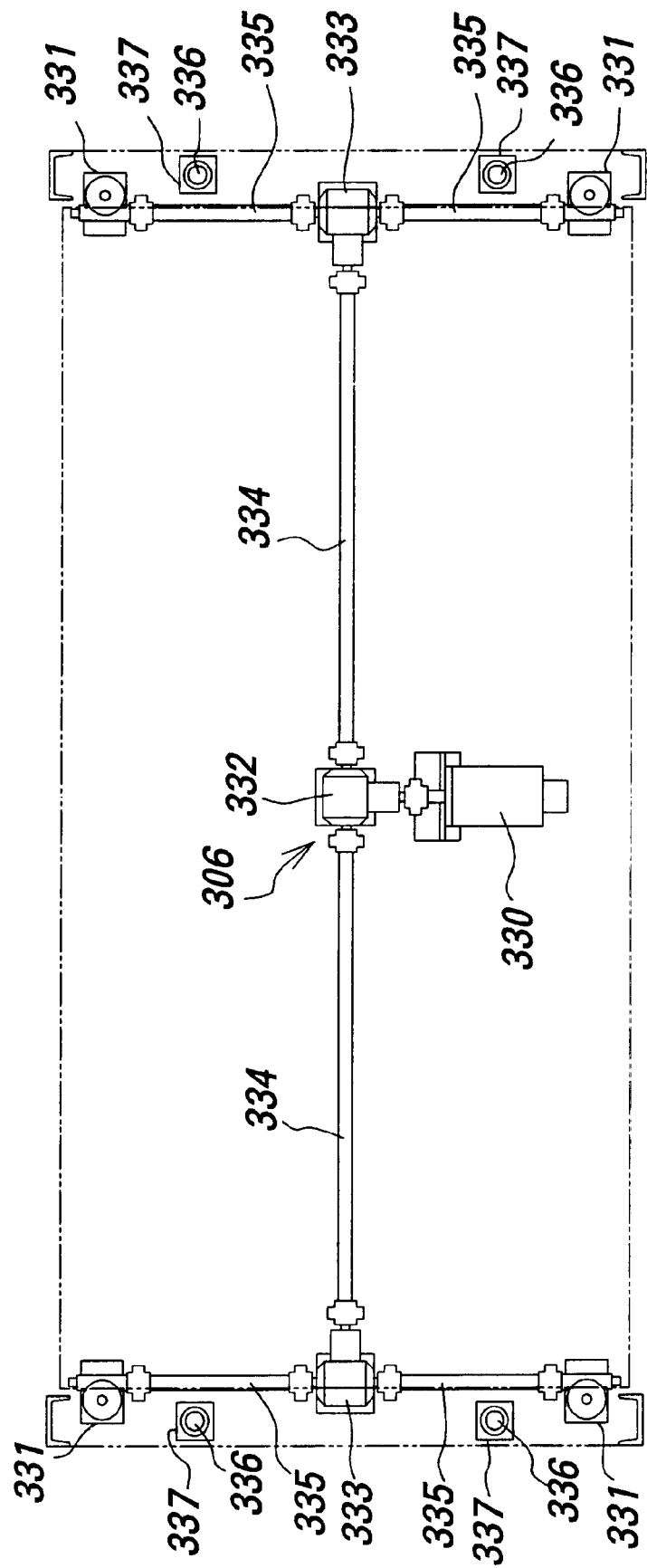
FIG. 21 is a top plan view of the mold exchanger system as seen in the direction of arrow 21—21 in FIG. 18.

In the next place, explanation is made of the height adjusting means 306 of the transfer means 302a, 302b. The type of height adjusting means is not limited provided that it can be suitably applied to a group of vulcanizing machines which are different from each other in terms of the mold transfer height. Here, with reference to FIG. 21 as well, the height adjusting means 306 is comprised of a motor 330, and two pairs of height adjusting jacks 331 which are driven by the motor 330 and thereby moved vertically upwards or downwards. The motor 330 is fixedly secured to the carriage 303. The height adjusting jacks 331 have lower ends that are fixedly secured to the four corners of the carriage 303, respectively, and upper ends that are connected to the support 305.

Provided that a positive and precise elevating movement is assured, the jacks 331 may be comprised of screw jacks, hydraulic jacks, or rack-type jacks. The illustrated embodiment makes use of screw jacks. Thus, the height adjusting means 306 is further comprised of a first gear box 332 for dividing the output torque of the motor 330 in the direction of arrow X, and a second gear box 333 for dividing the torque from the first gear box 332 in the direction of arrow Y.

The first gear box 331 and the second gear ox 332 are connected to each other by a pair of drive shafts 334. The screw jack 331 and the second gear box 332 are connected to each other by a pair of drive shafts 335. By this, when the male screw of the screw jack 331 is driven for rotation, it is possible to adjust the height of the transfer means 302a, 302b from the floor surface FL with reference to the carriage 303. Incidentally, the height adjusting means 306 may be comprised of an actuator mechanism.

As associated members of the height adjusting means 306, the carriage 303 has vertical guide members 336 at its four corners and the support 305 has two pairs of slide members 337 that are slidingly engageable with the respective guide members 336. Provision of these members 336, 337 ensures a smooth and accurate height adjustment of the transfer means 302a, 302b vertically upwards or downwards.

As mentioned above, the mold exchanger system 301 has a sufficient strength and can be freely applied to a number of vulcanizing machine groups without requiring modifications. Moreover, since the molds are exchanged by simple linear movement of the molds A, B in the vertical and horizontal directions, the system provides an improved exchanging efficiency, simple in structure and less expensive. The system can also be simply adopted to the non-uniformity of the mold supporting surfaces of the vulcanizing machines, by a slight height adjustment that can be achieved within a short time. The provision of a pair of transfer means 302a, 302b ensures an improved mold exchanging efficiency. Also, due to the longitudinal arrangement of the third conveyors 323a, 323b, it is possible to minimize the space for the mold exchanger system 301 as a whole.

The mold exchanger system 301 is further comprised of a controller (not shown), for automatization of a series of mold exchanging operations. The controller is inputted with various information required for exchanging the molds, e.g., identification information and other unique information of each vulcanizing machine which are arranged side-by-side, and serves to control a series of mold transfer operations of the mold exchanger system 301 upon receipt of exchange instruction command.

Operation of Third Embodiment

With reference to FIGS. 22(a) to 22(o) showing successive steps (a) to (o) of the mold exchanging process, respectively, explanation is made of the method of using the mold exchanger system shown in FIGS. 18 to 21, for removing the previously used molds B1, B2 from the lower portion 308 of the vulcanizing machine and transferring them to the mold exchanger system 301, and for subsequently transferring the new molds A1, A2 on the mold exchanger system 301 to the lower portion 308 of the vulcanizing machine.

In the step (a) shown in FIG. 22(a), the mold exchanger system 301 mounting thereon the new molds A1, A2 is stopped immediately in front of the vulcanizing machine for which the molds are to be exchanged, and a relative positioning is performed. In this instance, the mold exchanger system 301 assumes a state in which the next molds A1, A2 are lifted and the third conveyors 323a, 323b are situated in the longitudinal position. Such longitudinal position makes it possible to reduce the width of the mold exchanger system which is being moved. On the other hand, the previously used molds B1, B2 are suspended by the upper portion of the vulcanizing machine through a clamp means, not shown.

In the step (b) shown in FIG. 22(b), the second conveyors 322a, 322b are advanced with a slight clearance above the lower holders 309. The transfer means 302a, 302b are then moved downwards so that the lower surfaces of the second conveyors 322a, 322b are brought into abutment with the upper surface of the lower holder 309. On the other hand, the third conveyors 323a, 323b are rotated to assume the lateral position.

In the step (c) shown in FIG. 22(c), the mount portions 311a, 311b are moved over the first conveyors 321a, 321b and the second conveyors 322a, 322b and situated on the lower portion 308 of the vulcanizing machine. On this occasion, the mount portions 311a, 311b are each engaged by the pair of positioning pins 308a, 308b. By this, the relative positioning between the mount portions 311a, 311b and the previously used molds B1, B2 is achieved.

In the step (d) shown in FIG. 22(d), the previously used molds B1, B2 suspended from the upper portion 348 of the vulcanizing machine are moved downwards onto the mount portions 311a, 311b. On this occasion, the inner peripheral surface of each previously used mold B1, B2 is engaged with the register of the mount portion 311a, 311b, or with the projection 327a, 327b of the moving member 326a, 326b.

In the step (e) shown in FIG. 22(e), the previously used molds B1, B2 are disengaged from the upper portion 348 of the vulcanizing machine by releasing the clamp means, and the upper portion 348 of the vulcanizing machine is then moved upwards. In the step (f) shown in FIG. 22(f), the mount portions 311a, 311b mounting the previously used molds B1, B2 are moved rearwards. On this occasion, the mount portions 311a, 311b are passed immediately below the mount portions 310a, 310b mounting the new molds A1, A2 thereon and maintained in its elevated state.

In the step (g) shown in FIG. 22(g), the rearward movement of the mount portions 311a, 311b mounting the previously used molds B1, B2 is stopped at the rearmost side of the third conveyors 323a, 323b.

In the step (h) shown in FIG. 22(h), the mount portions 310a, 310b mounting the new molds A1, A2 are fully moved downwards, for the first time. On this occasion, the register or the hole in the mount portion 310a, 310b is fittingly engaged with the projection 327a, 327b of the moving member 326a, 326b. On the other hand, the mount portions 310a, 310b are disengaged from the support members 315a, 315b at the upper ends of the elevating rods 314a, 314b.

In the step (i) shown in FIG. 22(i), the moving members 326a, 326b are advanced, the mount portions 310a, 310b of the pair situated on the front side and the mount portions 311a, 311b of the other pair situated on the rear side are simultaneously advanced, and the next molds A1, A2 are held on the lower holders 309.

In the step (j) shown in FIG. 22(j), the next molds A1, A2 are clamped by the upper portion 348 of the vulcanizing machine, which has been moved downwards. In the step (k) shown in FIG. 22(k), the upper portion 348 of the vulcanizing machine and the next molds A1, A2 clamped thereby are moved upwards, while the mount portions 311a, 311b mounting the previously used molds B1, B2 is moved rearwards.

In the step (l) shown in FIG. 22(l), the mount portions 311a, 311b are positioned at the rearmost side of the third conveyors 323a, 323b. Incidentally, from the step (i) to the step (l), the mount portions 310a, 310b are moved jointly with the mount portions 311a, 311b.

In the step (m) shown in FIG. 22(m), the mount portions 310a, 310b are moved upwards to the initial height level. In the step (n) shown in FIG. 22(n), the mount portions 311a, 311b are moved to the positions immediately below the mount portions 310a, 310b that have been moved upwards. By this, the transfer of the previously used molds B1, B2 onto the mold exchanger system 301 is completed.

In the step (o) shown in FIG. 22(o), the third conveyors 323a, 323b are moved to their longitudinal position. Subsequently, the mold exchanger system is moved to a predetermined place, e.g., a mold stock place. On the other hand, the upper portion 348 of the vulcanizing machine is moved downwards to mount the next molds A1, A2 onto the lower holder 309, and the clamp is then released to complete all of the mold exchanging operations.

As explained above, the mold exchanging method using the mold exchanger system according to the third embodiment of the present invention requires only linear movement of the molds in the vertical and horizontal directions. Thus, the mold can be exchanged within a short time, under a highly precisely positioned state. Moreover, the provision of, and simultaneous operation of the pair of transfer means ensure that two molds A, B can be exchanged simultaneously with reference to a twin-mold type vulcanizing machine, to further improve the exchanging efficiency. Furthermore, the height adjusting means 306 can be used to promptly adopt the system to a vulcanizing machine having a different mold installation height.

While the present invention has been described above with reference to preferred embodiments, it is needless to say that various changes and/or modifications are possible without departing from the scope of the invention.

What is claimed is:

1. A mold exchanger system comprising two transfer means each for transferring into a vulcanizing machine a mold arranged outside of the vulcanizing machine, and transferring the mold arranged inside of the vulcanizing machine to outside thereof, a mount for supporting the transfer means, said transfer means being arranged in pair on the same mount, and a distance adjusting mechanism for adjusting a distance of said transfer means relative to each other, wherein:

said mold exchanger system comprises a height adjusting means for adjusting the transferring height of the mold, and a positioning means for positioning the mold relative to the vulcanizing machine.

2. A mold exchanger system comprising a transfer device for transferring into a vulcanizing machine a mold arranged outside of the vulcanizing machine, and transferring the mold arranged inside of the vulcanizing machine to outside thereof, and a mount for supporting the transfer device, wherein:

said transfer device comprises a body that is connected to its mount, a first conveyor fixedly secured to the body, a second conveyor that can be moved between a position adjacent to the first conveyor on the body and a position inside of the vulcanizing machine, a movable mold mounting plate to be mounted on and carried by the first and second conveyors in succession, a height adjusting means for positioning the mold relative to the vulcanizing machine, and a positioning means for positioning the mold relative to the vulcanizing machine.

3. The mold exchanger system according to claim 2, wherein said transfer device comprises a drive means for reciprocatingly moving the mold mounting plate between said body in the transfer means and inside of the vulcanizing machine.

4. The mold exchanger system according to claim 2, wherein said height adjusting means comprises a drive motor and a jack which can be elevated as it is driven by the drive motor, said jack having a top end which is connected to the body of the transfer means.

5. The mold exchanger system according to claim 4, wherein said jack of the height adjusting means has an elevating stroke that corresponds to the sum of a level difference between the reciprocating movement of the second conveyor and its abutment with a vulcanizing machine, and a difference in mounting height between the molds of a plurality of vulcanizing machines.

6. The mold exchanger system according to claim 2, wherein said positioning means comprises a positioning register for the mold, that is arranged at a center in an upper surface of the mold mounting plate, a plurality of notches arranged at side edge locations of the mold mounting plate on the side of the vulcanizing machine, and a plurality of positioning members which are situated on a back side of the vulcanizing machine and engageable with the respective notches.

7. The mold exchanger system according to claim 2, wherein said positioning means comprises a positioning register for the mold, that is arranged at a center in an upper surface of the mold mounting plates, a plurality of notches arranged at an outer peripheral surface of the mold on the side of the vulcanizing machine, and a plurality of positioning members which are situated on a back side of the vulcanizing machine and engageable with the respective notches.

8. The mold exchanger system according to claim 6, wherein the positioning members situated on the back side of the vulcanizing machine are arranged on the same circumference of a lower holder of the vulcanizing machine.

9. The mold exchanger system according to claim 1, wherein the mold exchanger system can be positioned relative to a vulcanizing machine in which two molds are mounted side by side as seen from a front side of the vulcanizing machine, and said transfer means of the pair are opposed to each other in a direction in which the two molds of the vulcanizing machine are arranged.

10. The mold exchanger system according to claim 1, wherein said distance adjusting mechanism comprises a moving means for reciprocatingly moving at least one of the transfer means in the opposing direction.

11. The mold exchanger system according to claim 10, wherein said moving means comprises a guide means for guiding said movement of said one of the transfer means, and a drive means for moving said one transfer means while being guided by said guide means.

12. The mold exchanger system according to claim 11, wherein said drive means for the transfer means comprises a ball-screw mechanism having a nut that is fixedly secured to the transfer means, and a motor for driving a male screw of the ball-screw mechanism.

13. The mold exchanger system according to claim 12, wherein said distance adjusting mechanism comprises a controller for controlling a rotating direction and a rotating speed of said motor based on a data representing the distance between the two molds in the vulcanizing machine and also on a data representing the distance between a center axis position of one of the molds and a reference point of the positioning means.

14. The mold exchanger system according to claim 1, wherein said pair of transfer means each comprise a height adjusting means for adjusting the transfer height of the mold to be mounted.

15. The mold exchanger system according to claim 14, wherein said height adjusting means comprising a motor fixedly arranged on the mount, two pairs of corner jacks on the mount, that can be driven by the motor and thereby elevated, a frame connected to top ends of elevating portions of the jacks, and a moving means in the distance adjusting mechanism, that is arranged on the frame.

16. The mold exchanger system according to claim 15, wherein the frame of said height adjusting means comprises sliding members engageable with respective guide members which project vertically from four corners of the mount, said sliding members being connected to the top ends of the elevating portions of the jacks.

17. The mold exchanger system according to claim 9, wherein said transfer means each comprise a first conveyor fixedly arranged in a direction perpendicular to said opposing direction, and a second conveyor that can be moved between a position adjacent to the first conveyor and a position inside of the vulcanizing machine.

18. The mold exchanger system according to claim 17, wherein said transfer means each comprise a movable mold mount plate to be carried by the first and the second conveyors.

19. The mold exchanger system according to claim 1, wherein said transfer means each comprise a mold positioning means for positioning the mold, which is being transferred, in a direction toward inside of the vulcanizing machine.

20. The mold exchanger system according to claim 19, wherein said mold positioning means comprises a notch formed in the mold mount plate and engageable with a positioning member provided at inside of the vulcanizing machine, and a mold centering register provided for the mold mount plate.

21. The mold exchanger system comprising a transfer means for transferring into a vulcanizing machine a mold arranged outside of the vulcanizing machine, and transferring the mold arranged inside of the vulcanizing machine to outside thereof, and a mount for supporting the transfer means, wherein:

said transfer means comprises a pair of mount portions for individually mounting two molds which are aligned in the same transfer direction, a transfer mechanism for individually moving the mount portions one by one, in its access position to and from the lower part of the vulcanizing machine, an elevating means for moving one of the mount portions vertically between said access positions level and a higher level, a height adjusting means for positioning the mold relative to the vulcanizing machine, and a positioning means for positioning the mold relative to the vulcanizing machine.

22. The mold exchanger system according to claim 21, wherein said elevating means is to engagement with said one of the mount portions during its upward movement, and disengaged from said one of the mount portions after completion of its downward movement.

23. The mold exchanger system according to claim 21, wherein said elevating means has a vertical stroke such that one of the mount portions carrying a mold can be passed through a lower side of another mount portion which is situated in its higher level.

24. The mold exchanger system according to claim 21, wherein said transfer means comprises a first conveyor fixedly arranged with reference to said mount, a second conveyor that can be moved between a position adjacent to the first conveyor and a position inside of the vulcanizing machine, and third conveyor that is arranged behind said first conveyor.

25. The mold exchanger system according to claim 24, wherein said third conveyor has a rotational center at a rear upper side of the transfer means and is rotatable between a lateral position in which it is aligned in the same direction as the first conveyor, and a longitudinal position on the rear side of the transfer means.

26. The mold exchanger system according to claim 24, wherein one of said mount positions is movable in the transfer direction above the first and second conveyors, and the other of the mount portions is movable in the transfer direction above the first and third conveyors.

27. The mold exchanger system according to claim 24, comprising at least one pair of said elevating means arranged adjacent to, and on both sides of the first conveyor.

28. The mold exchanger system according to claim 21, wherein said mount portions each comprise a mold positioning register.

29. The mold exchanger system according to claim 21, wherein the mold exchanger system comprises a movable carriage having the height adjusting means for adjusting the height of the transfer means.

30. The mold exchanger system according to claim 29, wherein said carriage supports thereon a pair of said transfer means that are arranged adjacent to each other in the moving direction of the carriage.

* * * * *